340-870.13
XR 3,983,549

United States Patent [19]
Akita et al.

[11] 3,983,549
[45] Sept. 28, 1976

[54] DIGITALLY-OPERATED DISPLACEMENT DETECTING SYSTEM

[75] Inventors: Sigeyuki Akita, Okazaki; Akira Kuno, Nagoya, both of Japan

[73] Assignee: Nippon Soken, Inc., Nishio, Japan

[22] Filed: Feb. 26, 1974

[21] Appl. No.: 445,901

[30] Foreign Application Priority Data
  Feb. 27, 1973  Japan.................................. 48-23917
  May 17, 1973  Japan.................................. 48-54934

[52] U.S. Cl.................................. 340/206; 340/181; 340/244 R
[51] Int. Cl.².......................................... G08C 19/16
[58] Field of Search ........... 340/203, 204, 206, 180, 340/181, 244 R, 52 R; 200/52 A, 61.52; 73/308, 313

[56] References Cited
UNITED STATES PATENTS

| | | | |
|---|---|---|---|
| 3,162,857 | 12/1964 | Sanders............................... | 343/203 |
| 3,467,889 | 9/1969 | Brough-Cunningham et al.... | 317/28 |
| 3,594,744 | 7/1971 | Caulier............................... | 340/206 |
| 3,696,383 | 10/1972 | Oishi et al............................ | 340/310 |
| 3,721,969 | 3/1973 | Stewart............................... | 340/207 |
| 3,818,161 | 6/1974 | Richey............................... | 200/61.47 |
| 3,820,073 | 6/1974 | Vercellotti............................ | 340/151 |

*Primary Examiner*—John W. Caldwell
*Assistant Examiner*—James J. Groody
*Attorney, Agent, or Firm*—Cushman, Darby & Cushman

[57]  ABSTRACT

A digitally-operated displacement detecting system, whereby a change in the level of the fuel in the fuel tank of an automobile is converted into a digital signal, and this digital signal is transmitted and received in accordance with a time-sharing multiplex transmission system to actuate a fuel meter to provide an accurate indication of the fuel level with minimum error and without being affected by any abnormal changes in the fuel level.

14 Claims, 19 Drawing Figures

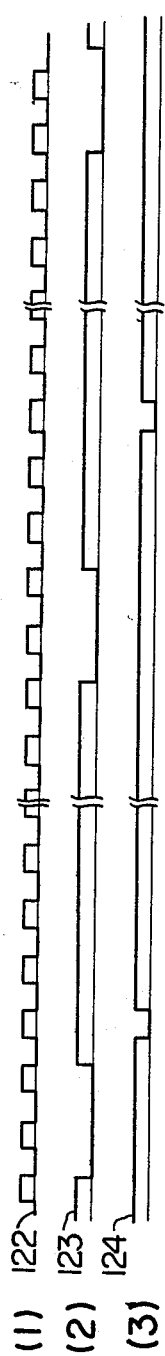
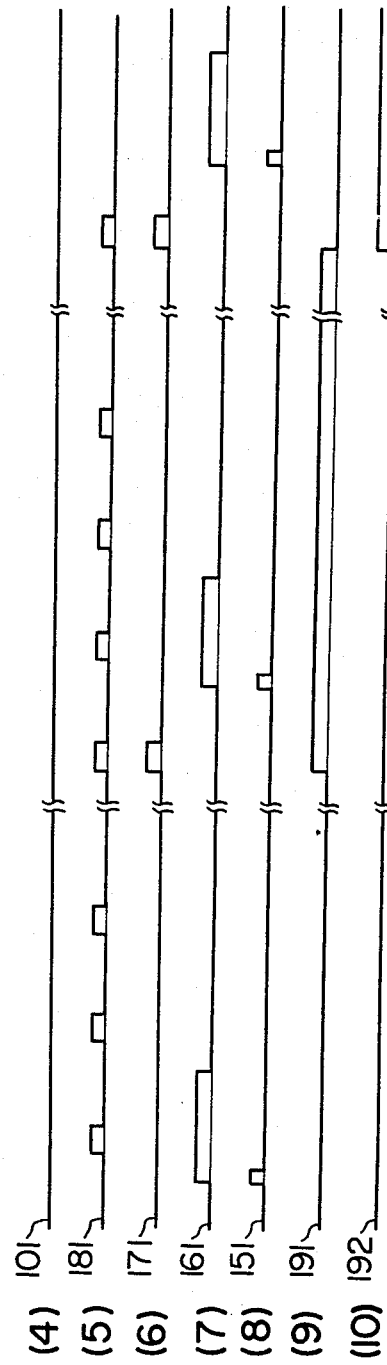
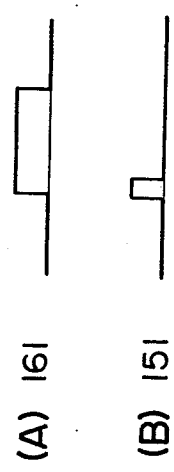
FIG. 5b
FIG. 6

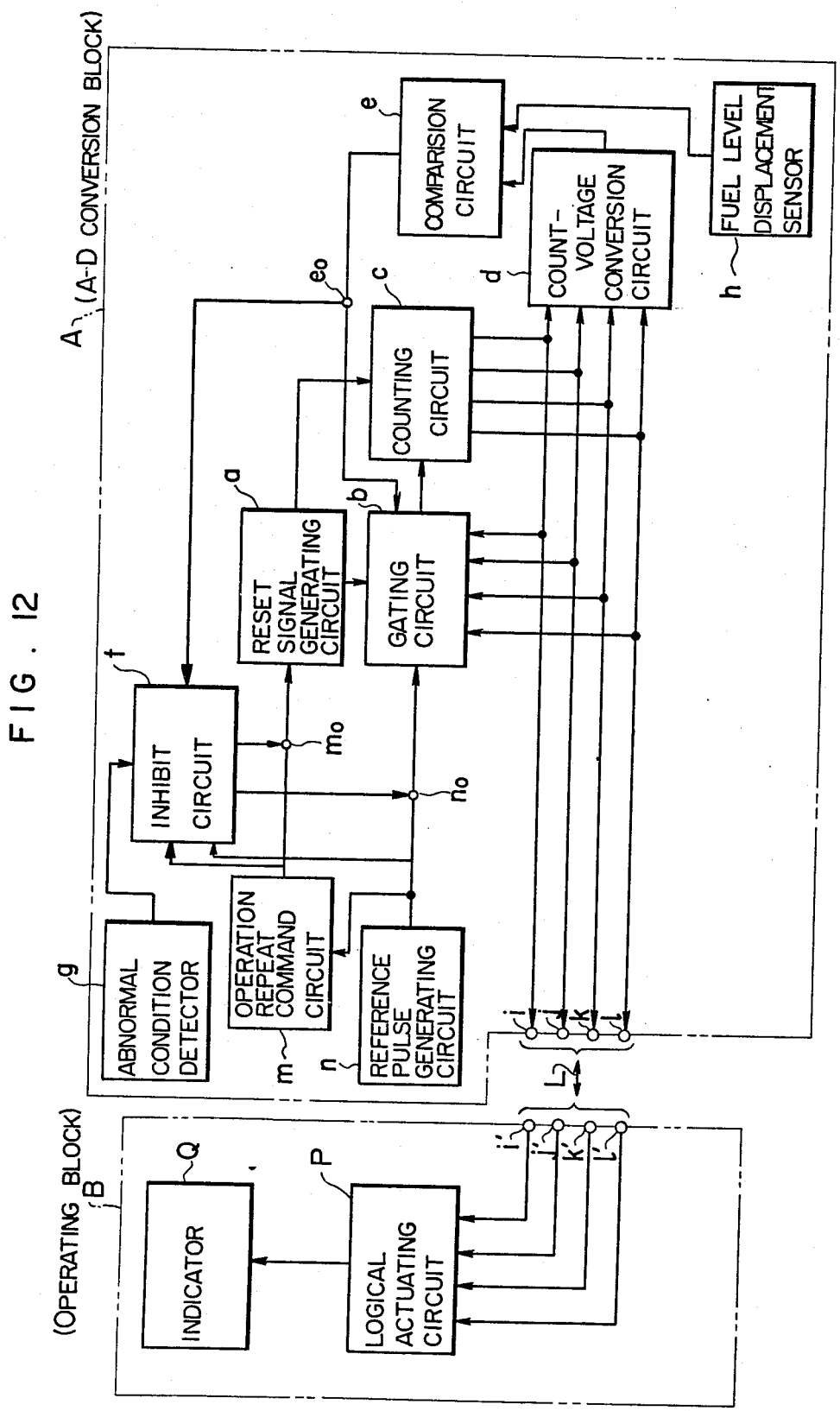

વ3,983,549

DIGITALLY-OPERATED DISPLACEMENT DETECTING SYSTEM

BACKGROUND OF THE INVENTION

1. Field of the Invention

The present invention relates to a digitally-operated displacement detecting system for liquid level detection which is applicable mainly to automobiles. More specifically, this invention relates to a digitally-operated displacement detecting system whereby the detected signal from a detector located in a fuel tank, for example, is converted into a digital signal and a fuel meter is actuated by this digital signal.

2. Description of the Prior Art

With conventional fuel meters for automobiles, when the magnitude of the resistance value of the detector located in the fuel tank varies, this variation changes the current flow and thus actuates the fuel meter directly connected to the detector. However, this conventional arrangement is disadvantageous in that it is difficult to utilize a time-sharing multiplex transmission system whereby the signals generated by a plurality of detectors and switches may be transmitted over a single line to actuate a plurality of loads associated therewith. Another disadvantage is that when the vehicle goes upgrade or downgrade, the liquid level in the fuel tank fluctuates so that the value of the detected signal varies and thus causes the fuel meter to give an erroneous indication.

SUMMARY OF THE INVENTION

With a view to overcoming the foregoing difficulty, it is an object of the present invention to provide a digitally-operated displacement detecting system in which reference pulses having a fixed frequency are counted by a counting circuit, whereby when the counting circuit's output voltage corresponding to its count attains the value of the detected voltage of a displacement detector, a holding logic gate circuit is closed to prevent the application of the reference pulses, holding the current count of the counting circuit and an indicator gives an indication of the count thus held, and following the count holding operation the counting circuit is reset by reset means, thereby enabling the counting circuit to convert a displacement into a digital signal while performing the dual functions of counting reference pulses and holding its count, ensuring easy prevention of erroneous detection of a displacement under abnormal conditions, and enabling the application of a time-sharing multiplex transmission to the system.

The displacement detecting system according to this invention has among its remarkable advantages the facts that its counting circuit is capable of not only counting the number of input pulses but also storing the count, and that the output signal of this counting circuit is provided in the form of a digital signal which can be set to the optimum value by adjusting the number of bit positions in the counting circuit and the conversion ratio of a count-voltage conversion circuit.

Another advantage of the system of this invention is the use of a reset inhibiting circuit connected to the counting circuit whereby any erroneous detection of the displacement detecting system due to abnormal fluctuation of the liquid level in the fuel tank can be prevented to ensure an accurate indication of fuel level with the minimum error.

A further advantage of the system is the provision of means for performing the operation of pulse modulation on the output count of the counting circuit and the associated demodulation means, whereby the digital output signal of the counting circuit may be transmitted and received by a time-sharing multiplex transmission system and consequently may different signals may be transmitted and received over the same signal transmission line.

BRIEF DESCRIPTION OF THE DRAWING

FIGS. 5 through 10 show an embodiment of a time-sharing multiplex signal transmission system used with the system according to this invention, in which:

FIGS. 5b(1) through 5b(10) are waveform diagrams useful for explaining the operation of the time-sharing multiplex signal transmission system.

FIGS. 6A and 6B are respectively an input waveform diagram and an output waveform diagram of a reset pulse generating circuit.

FIG. 7 is a wiring diagram showing in detail the internal circuit of the first counting block used in the transmission system of FIG. 5a.

FIG. 8 is a wiring diagram showing in detail the internal circuit of the combining block in the transmission system of FIG. 5a.

FIG. 9 is a block diagram of the second counting block used in the transmission system of FIG. 5a.

FIG. 10 is a wiring diagram showing in detail the internal circuit of the restoring block in the transmission system of FIG. 5a.

FIG. 12 is a block diagram showing the general construction of a second embodiment of the displacement detecting system according to the invention.

DESCRIPTION OF THE PREFERRED EMBODIMENTS

The present invention will be described in greater detail with reference to the illustrated embodiments hereunder.

Figure 1:
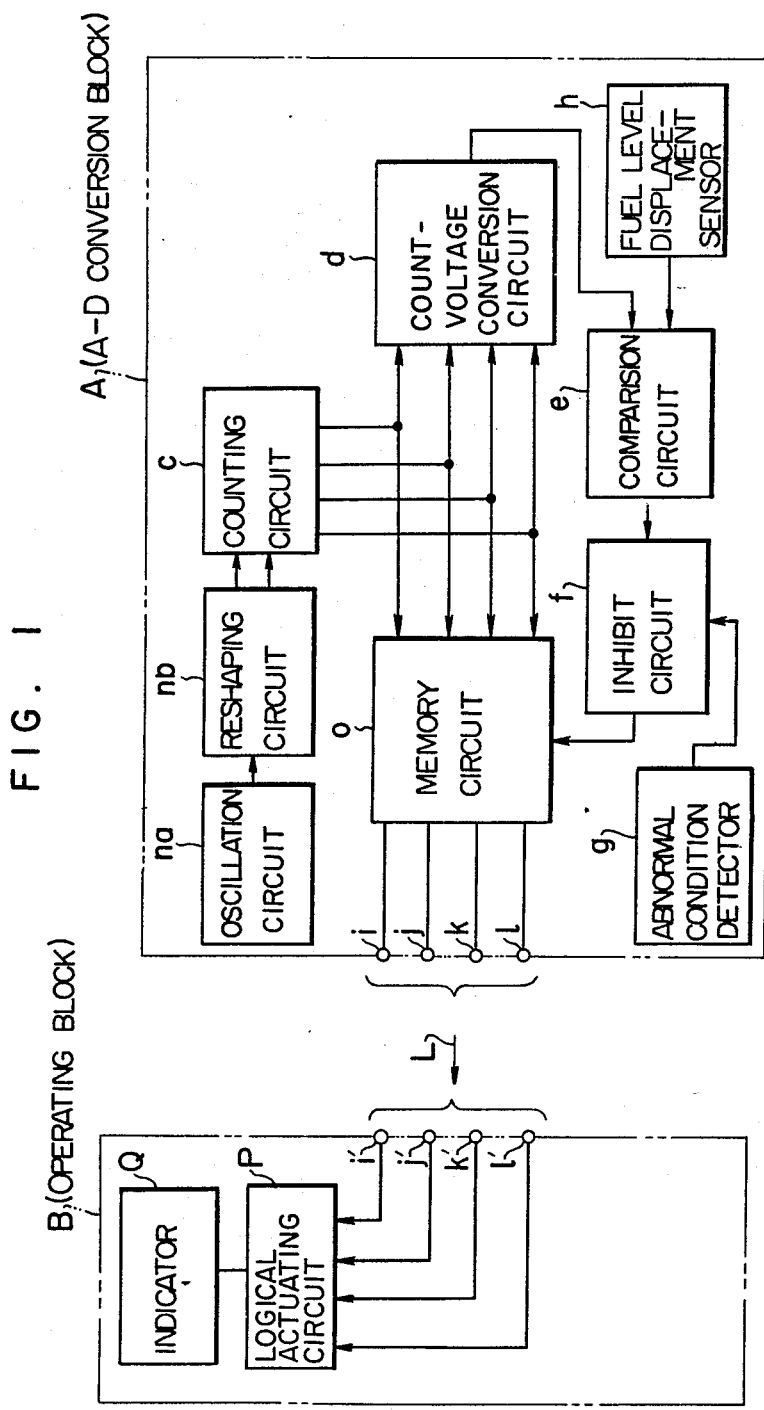
FIG. 1 is a block diagram showing the general construction of an embodiment of a displacement detecting system according to the present invention.

Referring first to FIG. 1 illustrating a block diagram of a first embodiment of this invention, letter A designates an A-D conversion block wherein the output signal of a fuel level displacement detector (hereinafter referred to as a sensor) is converted into a digital signal, and letter B designates an operating block for actuating an indicator or a load with the digital signal from the A-D conversion block A.

In the conversion block A, designated as $na$ is an oscillation circuit which oscillates at a predetermined frequency, $nb$ a reshaping circuit for reshaping the oscillation circuit output pulse wave into a reference pulse. Letter $c$ designates a counting circuit for counting the reshaped oscillation circuit output pulses, $d$ a count-voltage conversion circuit as a staircase waveform generating circuit for producing a staircase waveform from the output of the counting circuit $c$, $e$ a comparison circuit for comparing the staircase count voltage with the input voltage from the sensor, $f$ an inhibit circuit for blocking the output of the comparison circuit when there exist abnormal conditions, $O$ a memory circuit for storing the sensor operating conditions, $i, j, k$ and $l$ terminals which are output terminals where the displacement of fuel level is represented as a digital signal, $g$ an abnormal condition detector for generating an inhibit signal when abnormal conditions exist where the fuel level is caused to vary abnormally, $h$ a sensor for converting the displacement of fuel level into voltage to generate a detected signal.

In the operating block B, designated as $i', j', k'$ and $l'$ are input terminals for receiving the output digital signals from the conversion block A, P a logical actuating circuit for performing the logical operation on the applied digital signals, Q an indicator as a load responsive to the output of the logical circuit actuating P to give an indication. Here, the terminals $i, j, k$ and $l$ are connected to the terminals $i', j', k'$ and $l'$ so that the signal at the terminals $i, j, k$ and $l$ are transmitted therefrom and received at the terminals $i', j', k'$ and $l'$ by way of a line L by a time-sharing multiplex signal transmission system.

Figure 2:
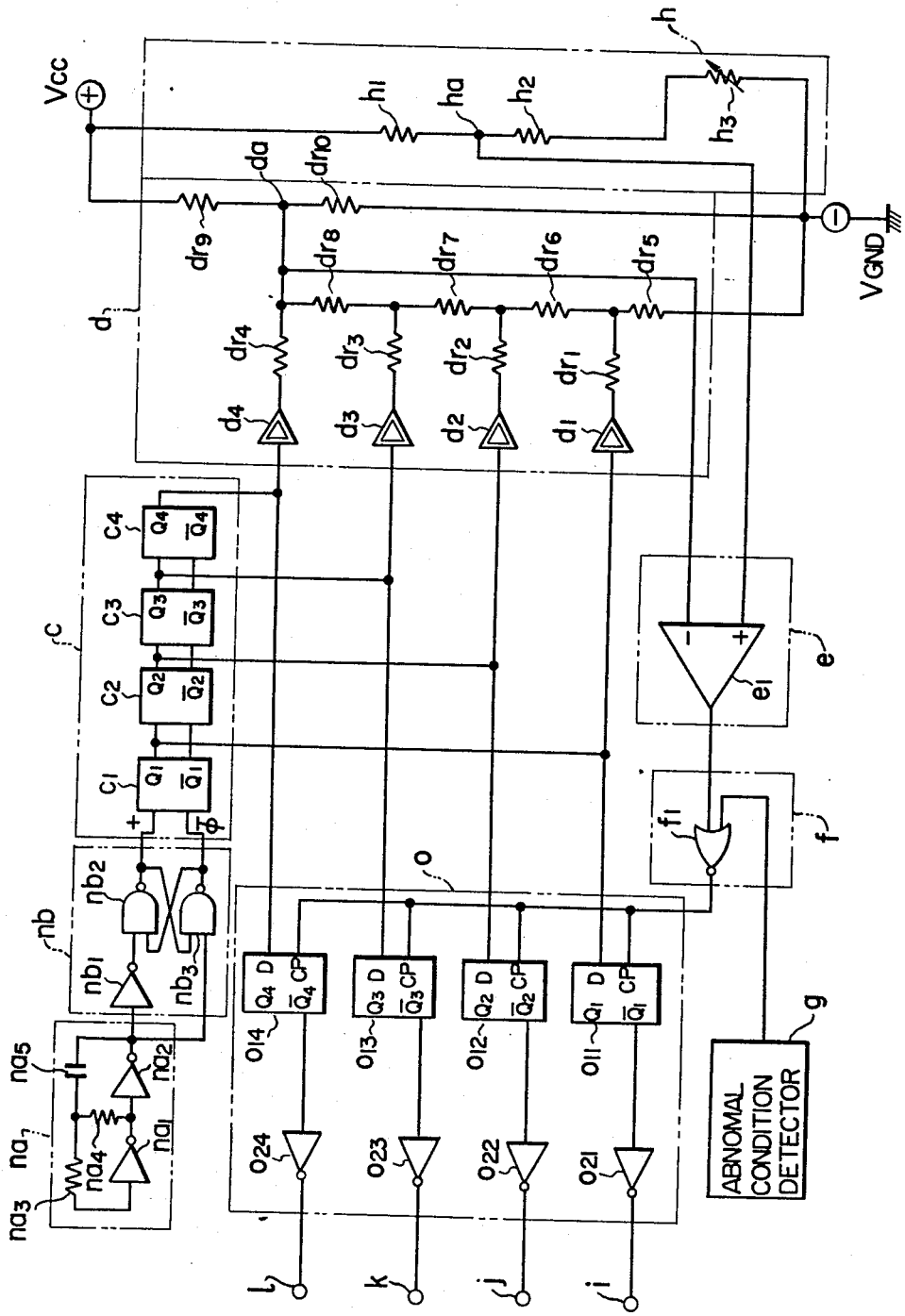
FIG. 2 and FIGS. 3(1) through 3(8) show respectively a wiring diagram showing the detailed circuit construction of the A-D conversion block used in the embodiment of FIG. 1 and the diagrams of waveforms generated at various points in the circuitry.
Figure 3:
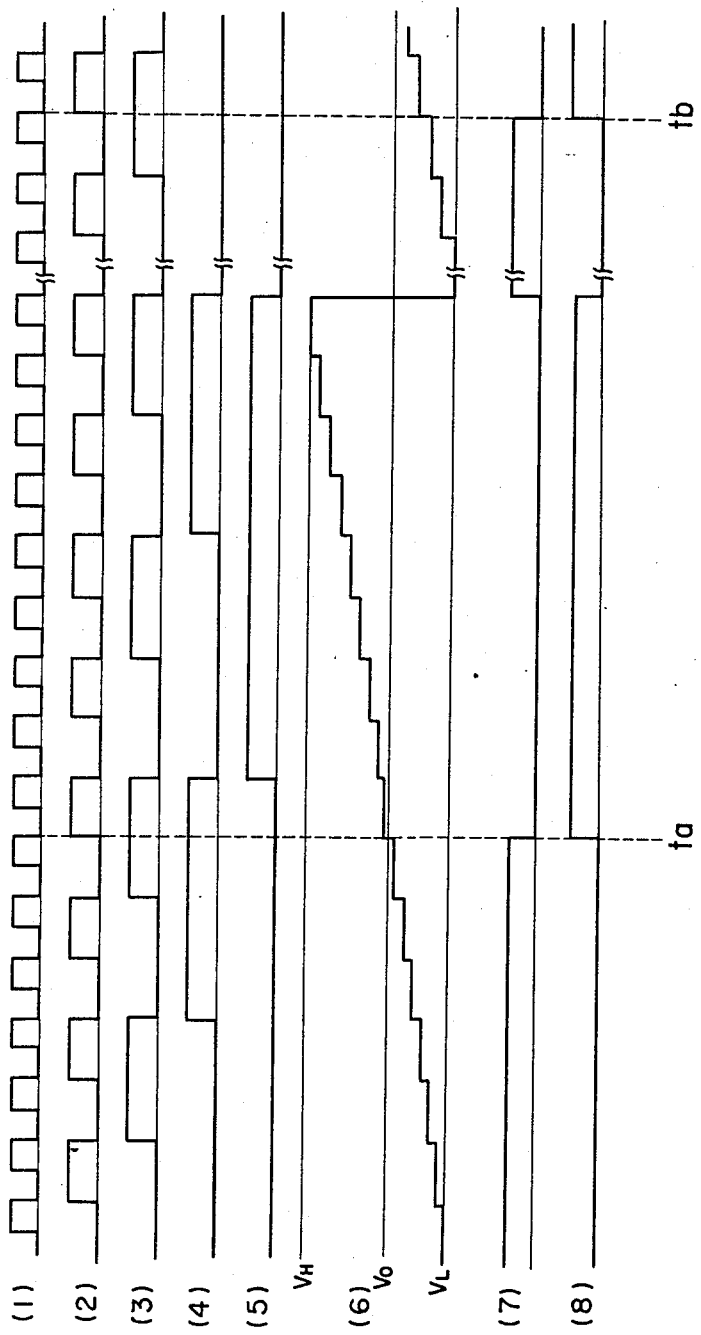

The construction of the first embodiment described above will be described further in detail. Referring first to FIG. 2 showing in detail an exemplary circuit of the conversion block A and FIGS. 3(1) through 3(8) showing the waveforms generated at various points in the block, the oscillation circuit $na$ comprises inverting gates $na_1$ and $na_2$, resistors $na_3$ and $na_4$ and a capacitor $na_5$, and it oscillates at a fixed frequency of 16 KHz, for example. The oscillation circuit output pulses are reshaped in the reshaping circuit $nb$ comprising an inverting gate $nb_1$ and NAND gates $nb_2$ and $nb_3$, whereby the reference pulses shown in FIG. 3(1) are generated at the output of the NAND gate $nb_2$ and the pulses of the opposite polarity to those shown in FIG. 3(1) are generated at the output of the NAND gate $nb_3$. These waveforms are applied to the counting circuit $c$ in which the waveform shown in FIG. 3(2) is generated at an output $Q_1$ of a first frequency divider $c_1$, the waveform of FIG. 3(3) is generated at an output $Q_2$ of a second frequency divider $c_2$, the waveform of FIG. 3(4) is generated at an output $Q_3$ of a third frequency divider $c_3$, and the waveform of FIG. 3(5) is generated at an output $Q_4$ of a fourth frequency divider $c_4$. These signals are respectively amplified by converter gates $d_1$, $d_2$, $d_3$ and $d_4$ in the staircase waveform generating circuit $d$ to supply respectively current to resistors $d_{r1}$, $d_{r2}$, $d_{r3}$ and $d_{r4}$ and resistors $d_{r5}$, $d_{r6}$, $d_{r7}$ and $d_{r8}$. The resistors $d_{r1}$, $d_{r2}$, $d_{r3}$, $d_{r4}$ and $d_{r5}$ have the same resistance value, and the resistors $d_{r6}$, $d_{r7}$ and $d_{r8}$ also have the same resistance value which is equal to one half of the resistance value of the resistors $d_{r1}$ to $d_{r5}$. With the resistors of these values connected as shown in FIG. 2, the voltage waveform shown in FIG. 3(6) is generated at a point $d_a$. And the potentials $V_H$ and $V_L$ shown in FIG. 3(6) may be selected as desired depending on the resistance values of resistors $d_{r9}$ and $d_{r10}$. The staircase count voltage varying between the potential $V_L$ and the potential $V_H$ as shown in FIG. 3(6) is applied to the inverting input terminal of a comparator $e_1$ or a comparison circuit $e$. On the other hand, the noninverting input terminal of the comparator $e_1$ receives a signal voltage at a point $h_a$ which varies with the variation of the resistance value of a sensing element $h_3$ and the voltage dividing action of resistors $h_1$ and $h_2$ in the sensor $h$. Consequently, the signal generated at the point $h_a$ is the voltage $V_0$ shown in FIG. 3(6). As a result, the signal appearing at the output of the comparator $e_1$ goes from "1" to "0" at a point $t_a$ in FIG. 3 and this waveform is shown in FIG. 3(7). The signal of FIG. 3(7) is then applied to the inhibit circuit $f$. Assuming now that at this time one input terminal of a NOR gate $f_1$ in the inhibit circuit $f$ has a non-inhibit signal or "0" signal thereat, the NOR gate $f_1$ is opened to produce an output as shown in FIG. 3(8). This signal waveform is then applied to the respective clock terminals CP of D-type flip-flops (hereinafter referred to as D-type FF's) $O_{11}, O_{12}, O_{13}$ and $O_{14}$ in the memory circuit O. Each of the D-type FF's $O_{11}, O_{12}, O_{13}$ and $O_{14}$ is designed so that when the signal at the clock terminal CP goes from "0" to "1", the data signal applied at its data terminal D is passed to its output Q and stored until the arrival of the next signal at the clock terminal CP, and the inverted signal appears at an output $\overline{Q}$. Namely, since the signal arriving at the data terminal D of the D-type FF $O_{11}$ at the point $t_a$ in FIG. 3 is a "1" signal as shown in FIG. 3(2), a "0" signal is generated at an output terminal $\overline{Q}_1$ of the D-type FF $O_{11}$. In the like manner, a "0" signal is generated at an output $\overline{Q}_2$ of the D-type FF $O_{12}$, a "0" signal at an output $\overline{Q}_3$ of the D-type FF $O_{13}$ and a "1" signal at an output $\overline{Q}_4$ of the D-type FF $O_{14}$, and these signals are respectively inverted by inverting gates $O_{21}, O_{22}, O_{23}$ and $O_{24}$ to produce a 4-bit digital signal 1110 at the output terminals $i, j, k$ and $l$. On the other hand, the sensing element $h_3$ of the sensor $h$ in FIG. 2 changes its resistance value in response to the variation of the fuel level (i.e., the resistance value increases as the fuel level drops). Thus, assuming now that the fuel level rises so that the potential at the point $h_a$ or the voltage $V_0$ in FIG. 3(6) decreases and the output signal of the comparator $e_1$ goes from "1" to "0" at a point $t_b$ in FIG. 3, in the similar manner as described above, at the instant when the input signal at the clock terminals CP of the D-type FF's $O_{11}, O_{12}, O_{13}$ and $O_{14}$ goes from "0" to "1", the data signals appearing at the data terminals of the D-type FF's $O_{11}$ through $O_{14}$ are delivered to the output terminals $i, j, k$ and $l$. In other words, a "1" signal is generated at the output terminal $i$, a "1" signal at the output terminal $j$, a "0" signal at the output terminal $k$ and a "0" signal at the output terminal $l$. Thus, in this embodiments 16 different kinds of fuel level may be indicated using all digital signals possible with different combinations of 4 binary digits. Further, when, for example, the vehicle goes upgrade or downgrade so that abnormal conditions occur where the level of the fuel in the fuel tank changes and thus the indicator fails to give an exact indication of the fuel level in the tank, the abnormal condition detector $g$ in FIG. 2 generates an abnormal condition signal or "1" signal and this "1" signal is applied to the NOR gate $f_1$. Consequently, the NOR gate $f_1$ in the inhibit circuit $f$ is closed to produce a "0" signal at its output and no input signal that goes from "0" to "1" is applied to the clock terminals CP of the D-type FF's $O_{11}$, $O_{12}$, $O_{13}$ and $O_{14}$. As a result, the outputs $\overline{Q}_1$ through $\overline{Q}_4$ of the D-type FF's $O_{11}$ through $O_{14}$ retain the previously established states despite the changes in the input signals at the respective data terminals D and thus the indication of this abnormal fuel level is prevented.

Figure 4:
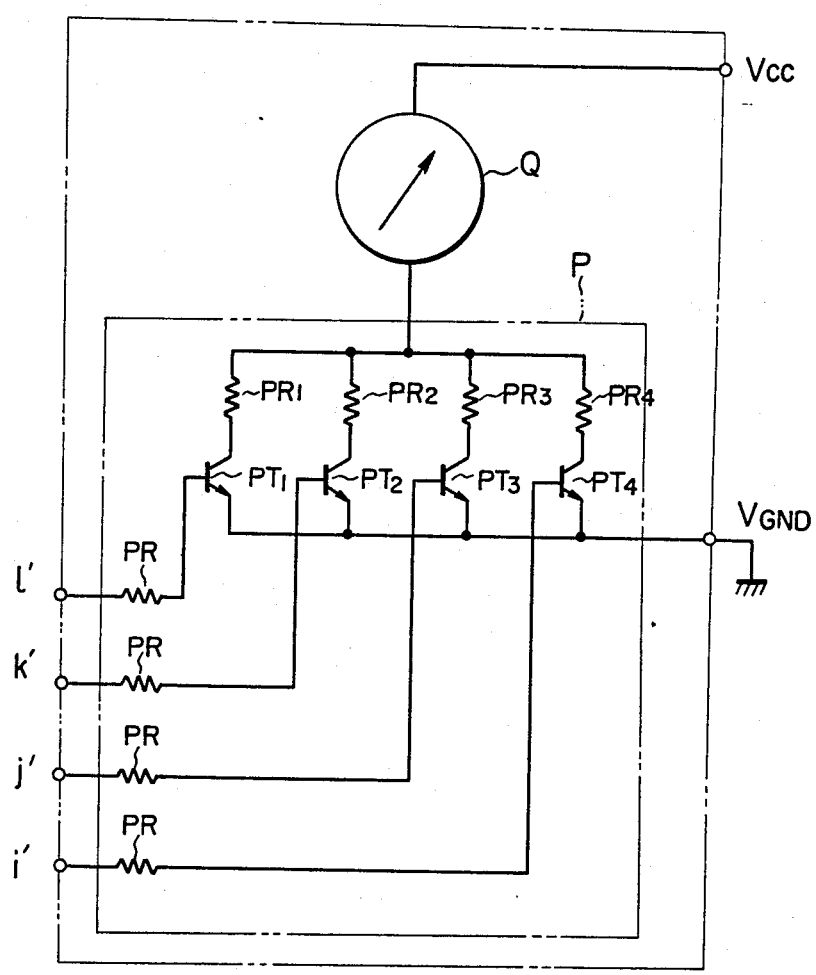
FIG. 4 is a wiring diagram showing in detail the internal circuit of the operating block in the embodiment of FIG. 1.

Referring now to FIG. 4, there is shown the detailed circuit construction of the operating block B which indicates the displacement of fuel level represented by a 4-bit digital signal at the output terminals $i, j, k$ and $l$ of the A-D conversion block A which is produced by converting the displacement of the fuel level into the corresponding digital signal in the manner described above. The input terminals $i', j'$ $k'$ and $l'$ receive the corresponding demodulated signal of the 4-bit digital signal. In this embodiment, in order to use a time-sharing multiplex signal transmission system that will be described later, the input terminals $i', j', k'$ and $l'$ in FIG. 4 receive the inverted version of the digital signal at the output terminals $i, j, k$ and $l$ in FIG. 2. This input signal is applied to the logical actuating circuit P. The logical actuating circuit P comprises four input resistors PR, collector resistors $PR_1$, $PR_2$, $PR_3$ and $PR_4$ and transistors $PI_1$, $PT_2$, $PT_3$ and $PT_4$, and the resistance values of the collector resistors $PR_1$, $PR_2$, $PR_3$ and $PR_4$ are selected so that $PR_4 = 2 \cdot PR_3 = 4 \cdot PR_2 = 8 \cdot PR_1$. Assuming now that the signal states at the point $t_a$ in FIG. 3 are applied to the input terminals $i', j', k'$ and $l'$, a "0" signal appears at the input terminal $i'$, a "0" signal at the input terminal $j'$, a "0" signal at the input terminal $k'$ and a "1" signal at the input terminal $l'$. Consequently, the transistors $PT_2$, $PT_3$ and $PT_4$ are cut off and the transistor $PT_1$ alone is turned on and therefore a resistance value $R_1$ across the power supply source terminals is given as $R_1 = \frac{1}{8} \cdot PR_4$, where $PR_4$ is the resistance value of the resistor $PR_4$. In this case, if a terminal $V_{CC}$ is connected to the positive terminal of the power supply source and a terminal $V_{GND}$ is connected to the negative terminal of the power supply source, a current $I_1$ that flows to the indicator Q is given as $I_1$ $8 \cdot V/PR_4$ (where V is the supply voltage) and the displacement of fuel level is indicated by the needle of the indicator Q. On the other hand, when the conditions at the point $t_b$ in FIG. 3 occur, in response to the similar operation described above, the transistors $PT_1$ and $PT_2$ are turned on and the transistors $PT_3$ and $PT_4$ are cut off so that a current $I_2$ that flows to the indicator Q becomes $I_2 = 12 \cdot V/PR_4$ and thus the needle of the indicator Q indicates the corresponding displacement of the fuel level.

Thus, in this embodiment, depending on the combination of signals applied to the input terminals $i', j', k'$ and $l'$, selected one out of 16 kinds of current $0 \cdot V/PR_4$, $1 \cdot V/PR_4$, $2 \cdot V/PR_4$, $3 \cdot V/PR_4 \ldots$, $15 \cdot V/PR_4$ flows to the indicator Q and operates the needle of the indicator Q to indicate the displacement of the fuel level in accordance with the magnitude of the current. While, in this embodiment, 16 kinds of combination are available, variation of the detected values of the sensor $h$ may be more minutely indicated by increasing the number of the FF's constituting the frequency dividers in the counting circuit $c$ of FIG. 2 and the number of the corresponding transistors in the logical actuating circuit P of FIG. 4. Further, the oscillation circuit $na$ is not limited to a CR oscillator and it may, for example, be an oscillator such as employing a quartz crystal vibrator, tuning fork vibrator or the like. Further, the D-type FF's used in the memory circuit O may be replaced with other forms of flip-flops such as JK FF's or RS FF's. Still furthermore, this invention is not limited to fuel meters and it may be applied to any kinds of meters for indicating displacement.

Next, an exemplary form of time-sharing multiplex signal transmission system incorporated in the system of this invention to transmit through pulse modulation a digital signal generated at the output terminals $i, j, k$ and $l$ of the A-D conversion block A will be described.

Figure 5A:
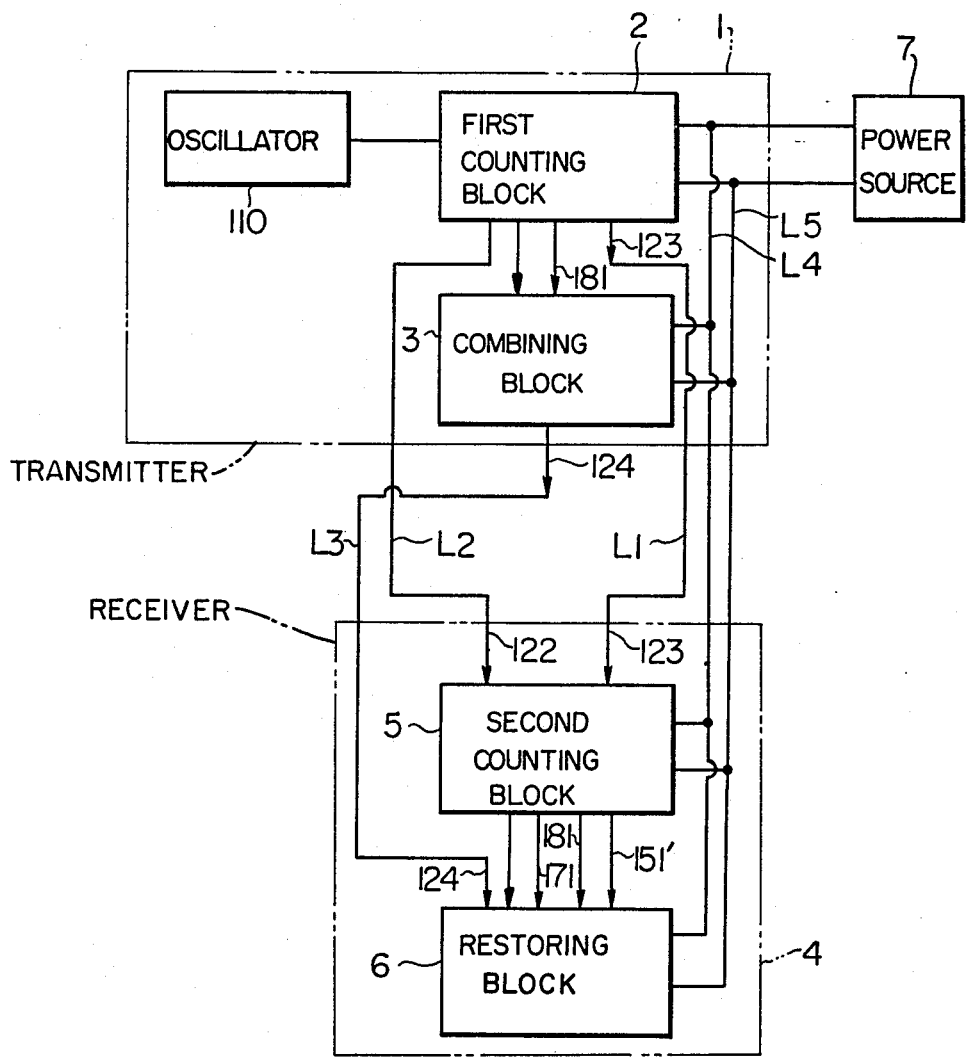
FIG. 5a is a block diagram showing the general construction of the entire time-sharing multiplex signal transmission system.

In FIG. 5a, which shows a block diagram of an exemplary time-sharing multiplex signal transmission system using pulse modulation, a transmitter 1 is constituted of a first counting block 2, a combining block 3 and an oscillator 110, while a receiver 4 consists of a second counting block 5 and a restoring block 6, and a power source 7 may be, for example, an accumulator. The general description of the time-sharing multiplex signal transmission system shown in FIG. 5a, will now be described by reference to the waveforms shown in FIG. 5b. The time base indicated at 101 in FIG. 5b(4) is divided into equal periods, each comprising smaller intervals 00, 01, 02, ..., 99, and signals to be transmitted to the receiving end are allotted to the intervals. The receiver discriminates whether the intervals contain the corresponding signals or not and picks up the predetermined ones of the signals only when they are contained in the respective intervals. This time-sharing process is performed on the basis of a synchronous signal 123 indicated in FIG. 5b(2) and delivered from the first counting block 2 and a timing signal 122 indicated in FIG. 5b(1), through the provision of the scale-of-10 counters in the counting blocks 2 and 5 respectively of the transmitter 1 and the receiver 4. These scale-of-10 counters generate an address signal corresponding to the thus defined intervals, i.e. time-shared intervals. The signals to be transmitted are combined together through the combining block 3 to produce a level signal 124 indicated in FIG. 5b(3), which is transmitted from the combining block 3. Therefore, the signal transmission between the transmitter 1 and the receiver 4 is through three lines, i.e. line $L_1$ for the synchronous signal 123, line $L_2$ for the timing signal 122 and line $L_3$ for the level signal 124, while two additional lines $L_4$ and $L_5$ are provided therebetween for the purpose of power feeding. The synchronous signal 123 in which a period corresponding in time to the time-shared interval 00 has a lower level, is transmitted from the counting block 2 to the counting block 5. A reset signal 151 shown in FIG. 5b(8) is obtained from a signal 161 indicated in FIG. 5b(7) in which a period corresponding to the time-shared interval 00 has a higher level. And the reset signal 151 resets frequency dividers and the scale-of-10 counters in the counting blocks 2 and 5. Each time-shared interval is superseded by the succeeding one every second period of the timing signal 122. Thus, the scale-of-10 counters provided in the counting blocks 2 and 5 are operated all in synchronism. The level signal 124 to be transmitted from the transmitter 1 to the receiver 4 is obtained by passing, i.e. taking a logical product of, three signals; a predetermined input signal to be transmitted, an address signal from the scale-of-10 counter containing addresses indicative of the numeral-pairs (such as 02 or 04) of the time-shared intervals into which the input signal is allotted, and a strobe signal 181 indicated in FIG. 5b(5); through an AND gate. In FIG. 5b, the level signal 124 shows a case where a signal to be transmitted is superposed on the addresses in the time-shared intervals indicated by the numeral-pairs 01 and 02. This level signal 124 is then restored through the restoring block 6 in the receiver 4 in the manner described below. The initial state is established by applying the inverted signal 151' of the reset signal 151 shown in FIG. 5b(8) to the reset input of a first memory circuit during the time-shared interval 00. Then, an output signal which is the logical product of the address signal appearing in the predetermined time-shared intervals and the level signal 124, is applied to the set input of the first memory circuit. Therefore, if an AND signal is applied to the set input the initial state of the memory circuit is cleared, while the initial state is maintained if there is no input to the memory circuit. Namely, the state of the first memory circuit is determined depending upon whether there is a level signal in respective time-shared intervals or not. The state is again cleared when the following time-shared interval 00 has been reached and it is necessary to transfer the content of the first memory to a second memory circuit before the former is cleared. This transfer operation is performed during the time-shared interval 99 by applying a transfer signal 171 shown in FIG. 5b(6), which is the logical product or AND of the interval 99 and the strobe signal 181 in FIG. 5b(5), to a gate which controls the transmission of the signal between the first and second memories. In FIG. 5b, if in a signal 124 a predetermined signal is in the interval 01 (or has a lower level in the interval), the content of the first memory is continuously fed to and stored in the second memory during the duration of a signal 191 shown in FIG. 5b(9) from the time-shared interval 99 in a period to the interval 99 in the next period. If, on the other hand, in the signal 124 a predetermined signal is in the interval 02, the transfer of the content takes place in a similar manner, but during the duration of a signal 192 shown in FIG. 5b(10) with a delay of one period with respect to the signal 191. Therefore, if in the level signal 124 a predetermined signal appears in every interval 01, the signal 191 will last without interruption from the interval 99 onward.

Figure 7:
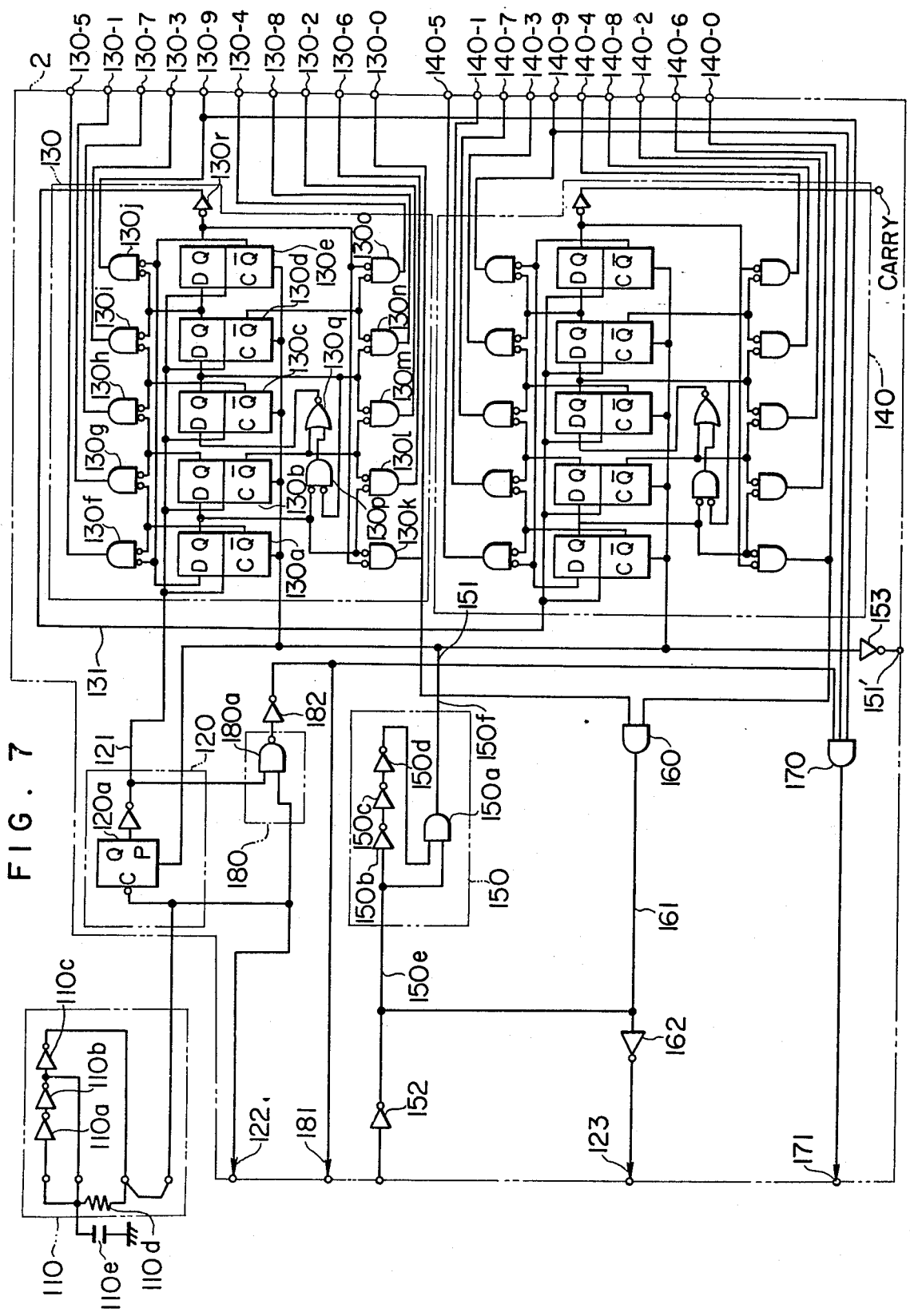

Now, the signal transmission according to the time-sharing system will be described with a detailed description of the circuit constitutions of the essential blocks with reference to FIGS. 7 to 10. FIG. 7 shows the constitutions of the oscillator 110 and the first counting block 2 in the transmitter 1.

The oscillator 110 has a well-known constitution comprising inverting gates 110a, 110b and 110c, a resistor 110d and a capacitor 110e. The frequency divider 120 comprises a FF 120a and its output signal 121 and input signal 122 are applied to a logic gate 180 where the logical operation is performed on these signals by a NAND gate 180a. The output of the NAND circuit 180 is then fed to an inverting gate 182, which in turn delivers the strobe signal 181. Reference numerals 130 and 140 indicate scale-of-10 counters whose output signal characteristics can be satisfied by using the well-known MOS IC CD4017A manufactured by RCA. The scale-of-10 counter 130 comprises D-type FF's 130a to 130e, negative logic AND gates 130f to 130p, a NOR gate 130q and an negative logic inverting gate 130r. The scale-of-10 counter 140 has the same constitution and operates in the same manner as the counter 130. The signals derived respectively from the output terminals 130-0 and 140-0 of the counters 130 and 140 are fed to an AND gate 160, the output of which is then applied to an inverting gate 162 to obtain a synchronous signal 123 at its output terminal. The reset pulse generating circuit 150 comprises an AND gate 150a, inverting gates 150b to 150d, an input terminal 150e and an output terminal 150f and it receives the output signal 161 of the AND gate 160 as its input signal. When the output signal 161 of the AND gate 160 whose waveform is shown in FIG. 6A (identical with that shown in FIG. 5b(7), is applied to the input terminal 150e, then at the output terminal 150f appears the reset signal 151 shown in FIG. 6B (identical with that shown in FIG. 5b(8). The reset signal 151 as the output of the reset pulse generating circuit 150 is applied to the reset terminals of the frequency divider circuit 120 and the scale-of-10 counters 130, 140 respectively.

An AND gate 170 and inverting gates 152 and 153 in the unit shown in FIG. 7 are useful only where the unit is used for the second counting block 5 in the receiver 4 but useless where the unit is used for the first counting block 2 in the transmitter 1. These elements are incorporated together with other circuit elements in a single IC unit or package and, therefore, if the unit is used for the first counting block 2 of the transmitter 1, the AND gate 170 and the inverting gates 152 and 153 are left out of electrical connection.

Figure 8:
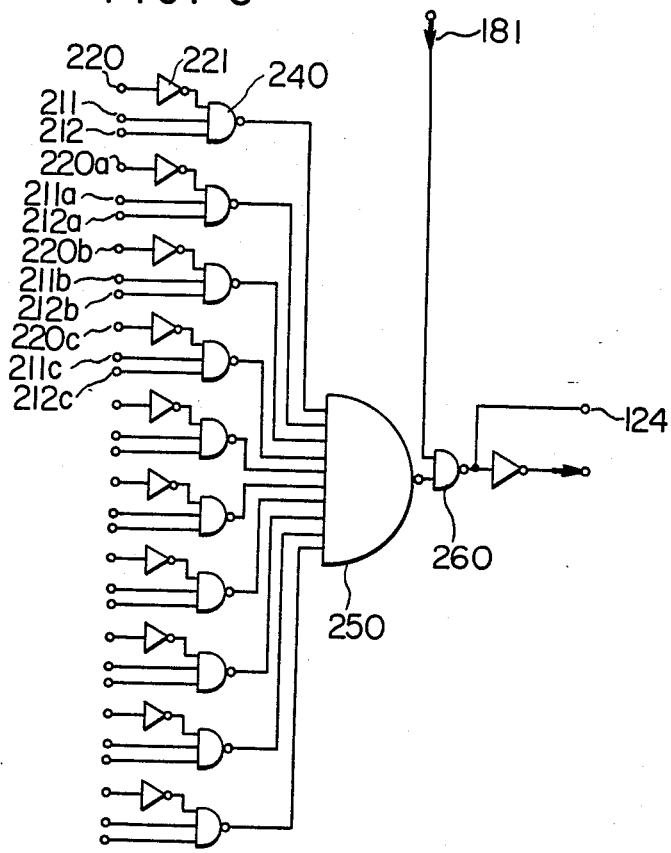

FIG. 8 shows the combining block 3 of the transmitter 1. The terminals 211 and 212 are connected respectively with the selected one out of the terminals 130-0 to 130-9 of the scale-of-10 counter 130 and the selected one out of the terminals 140-0 to 140-9 of the scale-of-10 counter 140 so as to obtain an address representative of a pedetermined time-shared interval. For example, in order to obtain an address indicating the time-shared interval 13, it is only necessary to connect the terminal 211 with the output terminal 140-1 of the counter 140 associated with the digit of the second place of the numeral-pair representing the time-shared interval and the trminal 212 with the output terminal 130-3 of the counter 130 associated with the digit of the first place of the numeral-pair representing the time-shared interval. Such connections are represented for simplicity's sake by a dashed line in FIG. 5a connecting the first counting block 2 with the combining block 3. A terminal 220 is an input terminal which receives a signal transmitted from the transmitter 1 to the receiver 4 and an inverting gate 221 is provided to deliver the inversion of the input signal. The NAND gate 240 takes the NAND of the signals applied to the terminals 211 and 212 and the signal delivered from the inverting gate 221. Namely, the gate 240 delivers a low-leveled "0" signal only when there are applied to the gate 240 a predetermined address signal and an input signal corresponding to the address. The output of the NAND gates 240 together with the outputs of the other NAND gates similar to the NAND gate 240 which are associated with the other addresses, is applied to a NAND gate 250. A NAND gate 260 takes the NAND of the output signal from the NAND gate 250 and the strobe signal 181 and delivers the level signal 124 to the line $L_3$.

Figure 9:
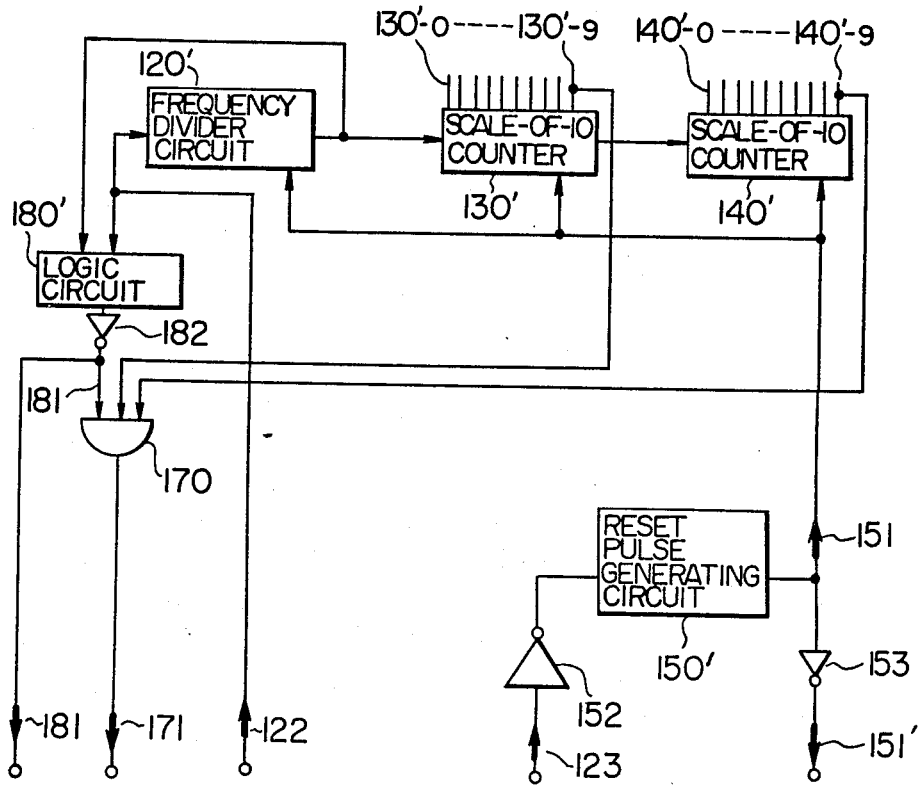

Now, the constitution and the operation of the receiver 4 will be described. The receiver 4 comprises the restoring block 6 and the second counting block 5 similar to the counting block 2 shown in FIG. 7 but with a somewhat different connection. FIG. 9 illustrates in detail the constitution of the counting block 5 for use in the receiver 4. The frequency divider circuit 120' is actuated by the timing signal 122 which is received from the first counting block 2 in the transmitter 1 through the line $L_2$. The reset pulse generating circuit 150' receives the output of an inverting gate 152 (see FIG. 7) which inverts the synchronous signal 123 fed through the line $L_1$. The reset signal 151 of the reset pulse generating circuit 150' is inverted through the inverting gate 153 to produce the inverted signal 151'. The signals appearing at the output terminal 130'-9 of a scale-of-10 counter 130' associated with the digit of the first place of the numeral-pair representing the time-shared interval and at the output terminal 140'-9 of a scale-of-10 counter 140' associated with the digit of the second place of the same numeral-pair, and the strobe signal 181 are applied to an AND gate 170 to produce the transfer signal 171. With the circuit configuration described above, the scale-of-10 counters 130' and 140' operate in synchronism with the transmitting end. The frequency divider circuit 120', the scale-of-10 counters 130' and 140', the reset pulse generating circuit 150' and the logic circuit 180' of the second counting block 5 in the receiver 4 have the same constitutions and operate in the same manner as those of the first counting block 2 in the transmitter 1 in FIG. 7.

Figure 10:
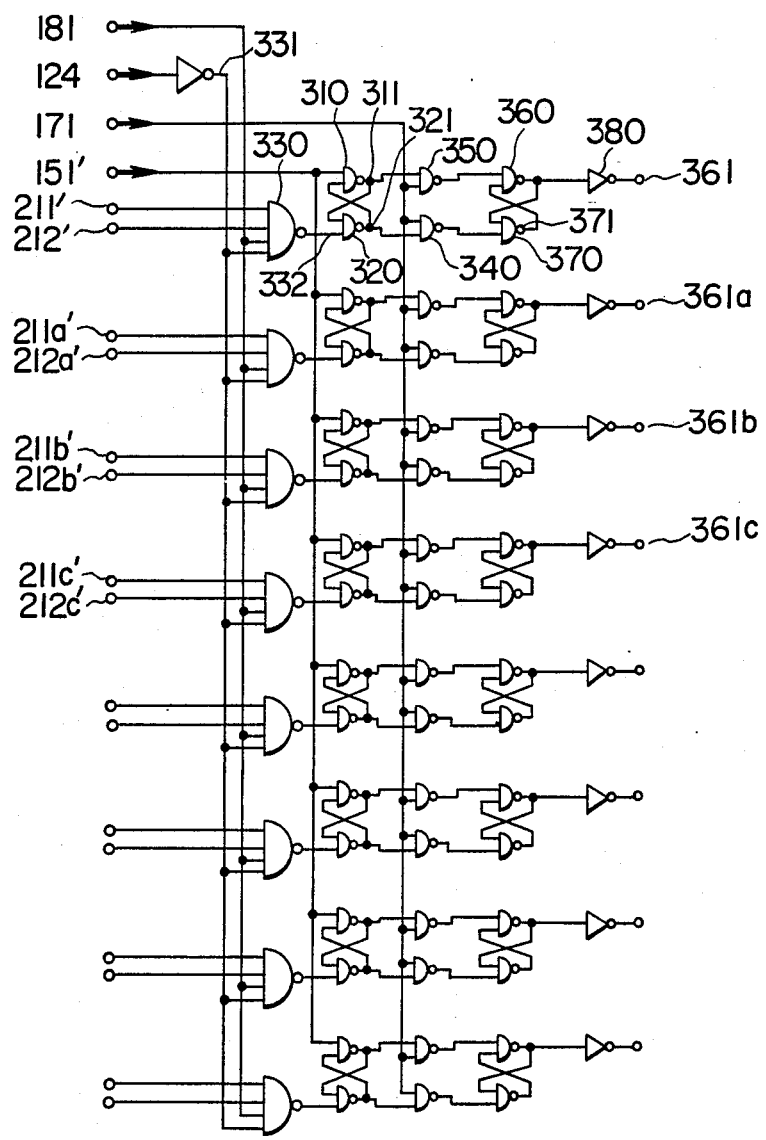

FIG. 10 shows the electrical connection of one of the constituents, i.e. equivalent components, of the restoring block 6. NAND gates 310 and 320 form a set-reset type FF serving as a first memory circuit. Numerals 330, 340 and 350 designates NAND gates. NAND gates 360 and 370 also form a set-reset type FF serving as a second memory circuit. Numerals 331 and 380 designate inverting gates. This unit receives the strobe signal 181 and the transfer signal 171 from the second counting block 5 shown in FIG. 9 and has terminals 211' and 212' which are adapted to receive an address signal representing a time-shared interval. For example, if the terminals 211' and 212' are connected respectively with the output terminal 140'-1 of the scale-of-10 counter 140' and the output terminal 130'-3 of the scale-of-10 counter 130', an address signal indicative of the time-shared interval 13 is introduced into the unit. These connections are represented for simplicity's sake by a dashed line between the second counting block 5 and the restoring block 6 in FIG. 5a.

The operation of the unit is as follows. The first memory circuit assumes its initial state upon reception of the inverted signal 151' of the reset signal 151 from the second counting block 5 to maintain the output terminal 311 at a higher level and the output terminal 321 at a lower level and this state continues after the inverted signal 151' of the reset signal 151 has ceased. If, for example, the address signal representing the interval 13 is applied from the counters 130' and 140' respectively to the terminals 211' and 212' while at the same time the level signal 124 applied to the unit through the line $L_3$ has the higher level allocated to the corresponding interval 13, then the terminal 331 is maintained at the higher level. If the strobe signal 181 assumes the higher level in response to the interval 13, the NAND gate 330 is enabled to maintain its output terminal 332 at the lower level. Accordingly, the state of the first memory circuit is changed so that the output terminals 321 and 311 are maintained respectively at the higher and lower level. And this state is maintained even after the time-shared interval 13 has passed away, since both the signal at the output terminal 332 and the inverted signal 151' of the reset signal 151 assume the higher level. The levels at the terminals 321 and 311 are transferred respectively to the NAND gates 360 and 370 forming the second memory circuit through the NAND gates 340 and 350 opened by the transfer signal 171 generated during the time-shared interval 99. Namely, the very signal appearing at the terminal 311 when the transfer signal 171 is on the point of being generated, is inverted by the inverting gate 380 and appears at the output terminal 361. This is true also for the terminals 321 and 371. The state of the second memory circuit is maintained until the next pulse of the transfer signal 171 has arrived.

We have described so far the construction of the time-sharing multiplex signal transmission system incorporated in the system of this invention. To use this time-sharing multiplex signal transmission system for transmitting the digital signals at the output terminals $i$, $j$, $k$ and $l$ in FIG. 1, it is necessary that the terminal $i$ is connected to the terminal 220 in FIG. 8 and the terminals 211 and 212 are respectively connected, for example, to the terminals 130-1 and 140-8 in FIG. 7 to specify the address, whereby in the time-sharing multiplex communication signal, the signal state of the signal generated at the terminal $i$ shown in FIG. 1 appears at the address 81. Similarly, by connecting the terminal $j$ to a terminal 220a in FIG. 8 and connecting terminals 211a and 212a respectively to the terminals 130-2 and 140-8 of FIG. 7, for example, the signal state of the signal at the terminal $j$ in FIG. 1 appears at the address 82. This equally applies to the terminals $k$ and $l$. The signal transmitted in this way appears as the level signal 124 shown in FIG. 10. Thus, by connecting terminals 130'-1 and 140'-8 of FIG. 9 respectively to terminals 211' and 212' in FIG. 10, the inverted signal of the signal state generated at the terminal $i$ in FIG. 1 directly appears at an output terminal 361. Also, by connecting terminals 130'-2 and 140'-8 of FIG. 9 respectively to terminals 211'a and 212'a, the inverted signal of the signal state generated at the terminal $j$ in FIG. 1 appears at an output terminal 361a. Further, in the same manner the inverted signals of the signal states generated at the terminals $k$ and $l$ in FIG. 1 respectively appear at output terminals 361b and 361c. Thus, by applying the signals appeared at the output terminals 361, 361a, and 361c respectively to the input terminals $i'$, $j'$, $k'$ and $l'$ in FIG. 1, the signal states at the terminals $i$, $j$, $k$ and $l$ can be reproduced at the terminals $i'$, $j'$, $k'$ and $l'$ to cause the indicator Q to indicate the displacement of the fuel level through the logical actuating circuit P.

Figure 11A:
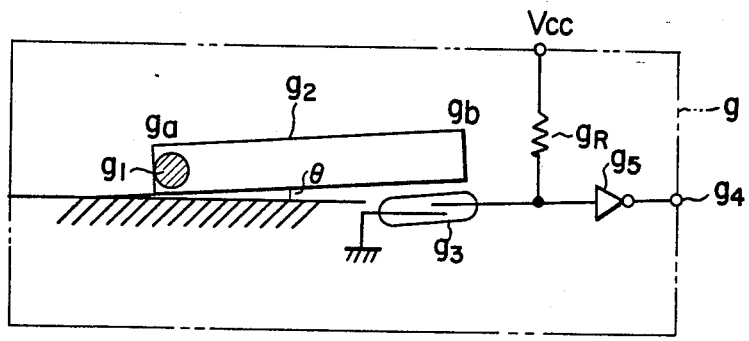
FIGS. 11a and 11b are schematic diagrams showing an embodiment of the abnormal condition detector used in the embodiment shown in FIGS. 1 and 2, with FIG. 11a showing the abnormal condition detector in the normal conditions and FIG. 11b showing the abnormal condition detector in the abnormal condition detecting position.
Figure 11B:
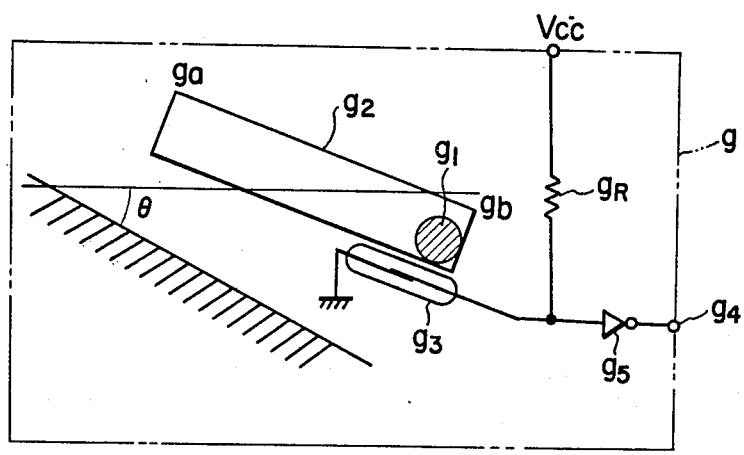

Referring now to FIGS. 11a and 11b, there is illustrated an exemplary embodiment of the abnormal condition detector $g$ shown in FIG. 1. FIG. 11a shows the operating conditions of the detector $g$ when the vehicle is running on a level road surface and FIG. 11b shows the operating conditions of the detector $g$ when the vehicle is running along a sloping road surface. In FIGS. 11a and 11b, letter $g_1$ designates a magnet ball, $g_2$ a cylinder of nonmagnetic material in which the magnet ball $g_1$ is moved and which is integrally secured to the vehicle, $g_3$ a reed relay, $g_5$ an inverting gate, $g_R$ a resistor. It is designed so that under the normal driving conditions of the vehicle, as shown in FIG. 11a, the magnet ball $g_1$ is always located at one end $g_a$ of the cylinder $g_2$ and the contacts of the reed relay $g_3$ are opened to generate a "0" signal at an output terminal $g_4$ through the inverting gate $g_5$. On the other hand, under the abnormal conditions where the vehicle is inclined while running along a slope, as shown in FIG. 11b, the magnet ball $g_1$ is moved to the other end $g_b$ of the cylinder $g_2$ so that the contacts of the reed relay $g_3$ are closed to generate a "1" signal at the output terminal $g_4$ through the inverting gate $g_5$. This "1" signal is applied to the NOR gate $f_1$ in FIG. 2 to prevent the production of a fuel level detecting signal in the manner described earlier.

The detector for detecting abnormal conditions due to the inclination of the vehicle may also comprise a mercury switch whose contacts are opened or closed through mercury when the vehicle is running on a level road surface or when the vehicle inclines while running along a sloping road surface.

A second embodiment of this invention will now be described with reference to the block diagram of FIG. 12 illustrating the overall construction of the second embodiment. In FIG. 12, letter A designates an A-D conversion block for converting the output signal of a fuel level displacement sensor into a digital signal, B an operating block for actuating an indicator or a load with the digital signal from the conversion block A.

In the A-D conversion block A, letter $a$ designates a reset signal generating circuit responsive to an operation repeat reset signal applied to a terminal $m_0$ to reset and instruct a counting circuit $c$ to restart its operation, $b$ a gating circuit for passing reference pulses of a predetermined frequency arriving at a terminal $n_0$ to the counting circuit $c$, $c$ the counting circuit for counting the reference pulses of a predetermined frequency, $d$ a count-voltage conversion circuit for producing a staircase count voltage from the output count of the counting circuit $c$, $e$ a comparison circuit for comparing the staircase count voltage with the detected voltage from a fuel level displacement sensor $h$, $f$ an inhibit circuit for blocking the output of the comparison circuit $e$ when abnormal conditions exist, $g$ an abnormal condition detector of the type as used in the previously described first embodiment which generates an inhibit signal under abnormal conditions where the fuel level is caused to fluctuate abnormally, $h$ the fuel level displacement sensor for converting the displacement of fuel level into a voltage, $n$ a reference pulse generating circuit for generating reference pulses having a predetermined frequency, $m$ an operation repeat command circuit for generating operation repeat reset signals having a period considerably greater than that of the reference signal and longer than the time required for the generation of the output from the comparison circuit $e$. Terminals $i, j, k$ and $l$ are output terminals where the displacement of fuel level is represented as digital signals. In FIG. 12, broken lines indicate the connections of the inhibit circuit $f$.

In the operating block B, terminals $i', j', k'$ and $l'$ are input terminals for receiving the digital signals transmitted from the conversion block A, letter P designates a logical actuating circuit for performing the logical operation on the applied digital signals, Q an indicator as a load which is responsive to the output of the logical actuating circuit P to give an indication. The terminals $i, j, k$ and $l$ are connected respectively to the terminals $i', j', k'$ and $l'$ so that the digital signals at the terminals $i, j, k$ and $l$ is transmitted and received at the terminals $i', j', k'$ and $l'$ through a line L by a time-sharing multiplex signal transmission system that will be described later.

Figure 13:
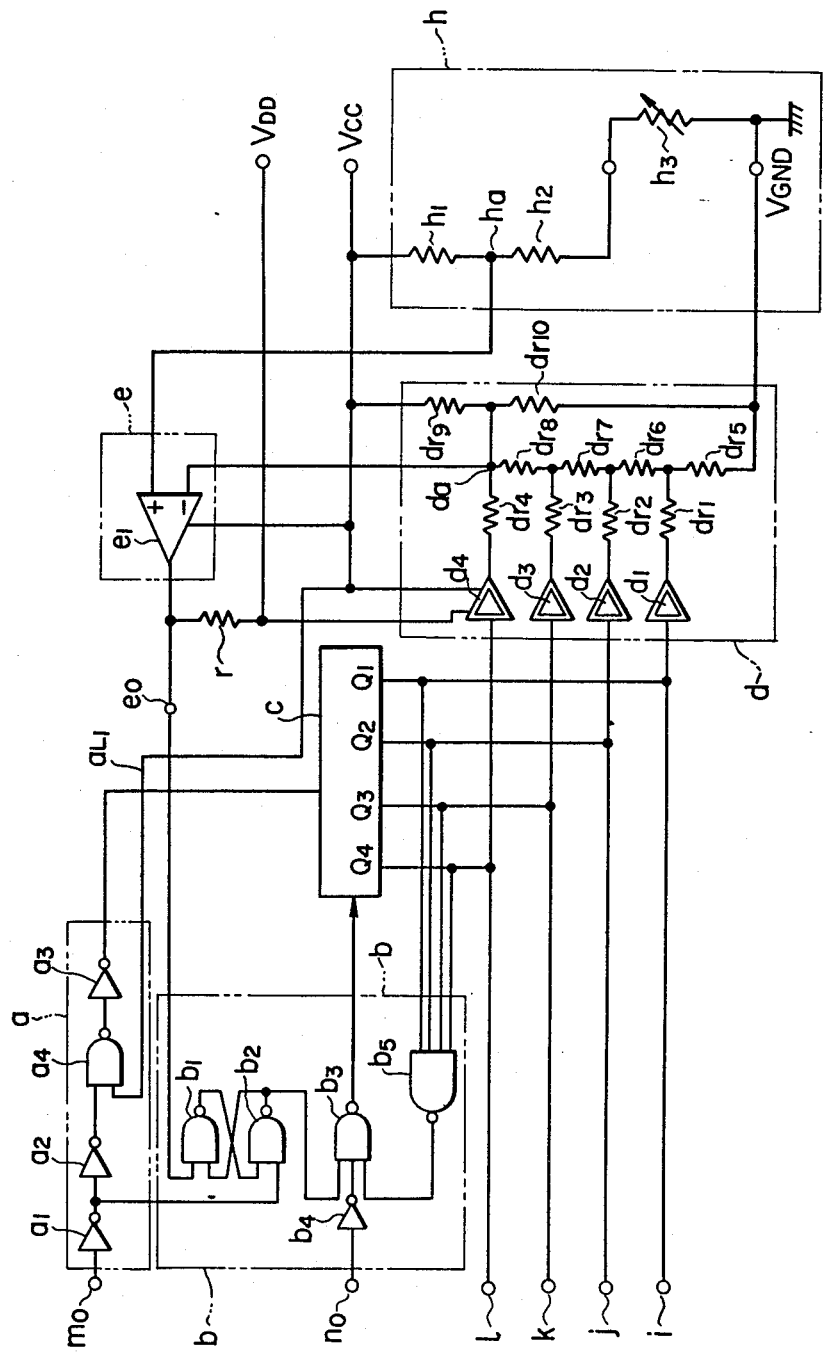
FIG. 13 and FIGS. 14(1) to 14(9) respectively show a detailed circuit diagram of the principal portion of the A-D conversion block in the second embodiment of FIG. 12 and diagrams showing the waveforms generated at various points in the block.
Figure 14:
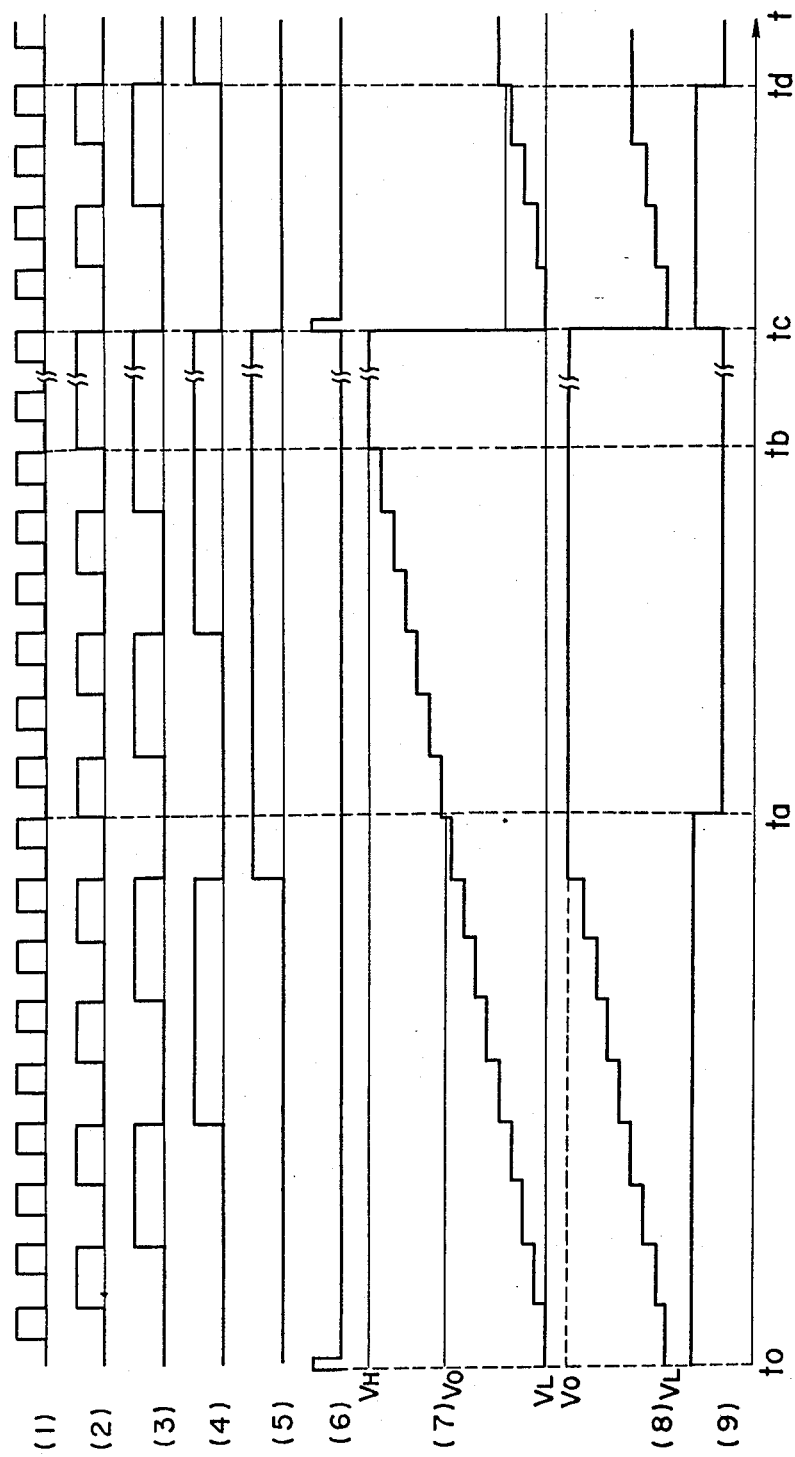

The above-described construction of the second embodiment will be described further in detail. In FIG. 13, there is illustrated a wiring diagram showing an exemplary circuitry of the conversion block A excluding the inhibit circuit section, and FIG. 14 is a diagram showing the waveforms generated at various points in the circuitry. In FIG. 13, letters $V_{CC}$ and $V_{DD}$ designate power supply terminals.

The supply voltage is applied from a power supply source through the supply terminal $V_{CC}$ to the circuits such as the count-voltage conversion circuit, the comparison circuit and the displacement sensor by means of a key switch of a vehicle only when the displacement of fuel level is to be indicated.

More specifically, when the key switch is in the off position, the supply voltage is not applied to the circuits such as the conversion circuit, the comparison circuit and the sensor to prevent power from being uselessly consumed.

Assume now that the key switch is in the on position, that is, the supply voltage is being applied to both of the supply terminals $V_{CC}$ and $V_{DD}$. The reset signal generating circuit $a$ comprises a NAND gate $a_4$ and inverting gates $a_1$, $a_2$ and $a_3$, whereby when the operation repeat reset signal shown in FIG. 14(6) (the same as the waveform shown in FIG. 5b(8) and FIG. 6(B)) is applied to the terminal $m_0$, an operation repeat command reset signal (the same signal as shown in FIG. 14(6)) is generated at the output of the inverting gate $a_3$ through the inverting gates $a_1$ and $a_2$, the NAND gate $a_4$ and the inverting gate $a_3$ to reset the counting circuit $c$. The gating circuit $b$ comprises NAND gates $b_1$, $b_2$, $b_3$ and $b_5$ and an inverting gate $b_4$, whereby at a time $t_0$ the output signal of the inverting gate $a_1$ places the set-reset type FF comprising the NAND gates $b_1$ and $b_2$ in the set state and a "1" signal is generated at the output of the NAND gate $b_2$. On the other hand, a "1" signal is appearing at the output of the NAND gate $b_5$ constituting an inhibit logical circuit. At this instant, the reference pulses shown in FIG. 14(1) (the same waveform shown in FIG. 5b(1)) are applied to the terminal $n_0$ and they are supplied to the NAND gate $b_3$ through the inverting gate $b_4$. Since the other two inputs of the NAND gate $b_3$ have the "1" signals as mentioned above, its output signal is the reference pulse passed therethrough and the output signals are then applied to the input of the counting circuit $c$. The counting circuit $c$ may be satisfactorily implemented with only the known RCA MOS IC CD4024A. If, in this counting circuit $c$, $Q_1$ represents the output of the first stage FF, $Q_2$ the output of the second stage FF, $Q_3$ the output of the third stage FF and $Q_4$ the output of the fourth stage FF, the output signals at the respective outputs $Q_1$, $Q_2$, $Q_3$ and $Q_4$ are generated as shown respectively in FIGS. 14(2), 14(3), 14(4) and 14(5). Assuming now that all of the output signals at the outputs $Q_1$, $Q_2$, $Q_3$ and $Q_4$ are "1" signals as shown at a time $t_b$ in FIG. 14, a "0" signal appears at the output of the NAND gate $b_5$ so that there is no longer any reference pulse arriving at the input of the counting circuit $c$ and the counting circuit $c$ is held in this state with the "1" signals appearing at the outputs $Q_1$, $Q_2$, $Q_3$ and $Q_4$ until the reset signal shown in FIG. 14(6) arrives at a time $t_c$ in FIG. 14. When this reset signal arrives, the counting circuit $c$ is reset and the signal at the output of the NAND gate $b_5$ goes from "0" to "1" thus opening the NAND gate $b_3$ and causing the counting circuit $c$ to restart its counting operation as mentioned earler. In this way, the number of reference pulses applied to the counting circuit $c$ is limited to 15 pulses by the NAND gate $b_5$. The output signals at the outputs $Q_1$, $Q_2$, $Q_3$ and $Q_4$ are applied to converter gates $d_1$, $d_2$, $d_3$ and $d_4$ in the count-voltage conversion circuit $d$. The converter gates $d_1$, $d_2$, $d_3$ and $d_4$ may be satisfactorily implemented with the known RCA MOS IC CD4010A alone, and the power is supplied to this circuit by the apply voltage applied to the supply terminals $V_{DD}$ and $V_{CC}$ to flow current to resistors $d_{r1}$, $d_{r2}$, $d_{r3}$ and $d_{r4}$ and resistors $d_{r5}$, $d_{r6}$, and $d_{r7}$ and $d_{r8}$.

Here, the resistors $d_{r1}$, $d_{r2}$, $d_{r3}$, $d_{r4}$ and $d_{r5}$ have the same resistance value, and the resistors $d_{r6}$, $d_{r7}$ and $d_{r8}$ also have the same resistance value which is equal to ½ of that of the resistors $d_{r1}$ through $d_{r5}$. With the resistors of these resistance values combined and arranged as shown in FIG. 13, a staircase count voltage appears at a point $d_a$ which has the waveform shown in FIG. 14(7) until the count of the counting circuit $c$ attains its predetermined saturation count. The upper and lower potentials $V_H$ and $V_L$ shown in FIG. 14(7) may be selected as desired in dependence on the resistance values of resistors $d_{r9}$ and $d_{r10}$. The count voltage having a staircase waveform that varies between the lower potential $V_L$ and the upper potential $V_H$ as shown in FIG. 14(7) is applied to the inverting input terminal of a comparator $e_1$ constituting the comparison circuit $e$. The noninverting input terminal of the comparator $e_1$ receives the detected voltage at a point $h_a$ which varies in accordance with the variation in the resistance value of a sensing element $h_3$ and the voltage dividing action of resistors $h_1$ and $h_2$ in the fuel level displacement sensor $h$. The detected voltage generated at the point $h_a$ becomes the voltage $V_0$ shown in FIG. 14(7). Consequently, the output signal of the comparator $e_1$ goes from "1" to "0" at a time $t_1$ in FIG. 14. The waveform of this comparator output is shown in FIG. 14(9), and the waveform of the count voltage generated at this time at the point $d_a$ in the count-voltage conversion circuit $d$ is shown in FIG. 14(8). Then, the comparator output shown in FIG. 14(9) is applied to the input of the set-reset type FF NAND gate $b_1$ in the gating circuit $b$.

As a result, at the time $t_a$ in FIG. 14, the signal at the output of the NAND gate $b_1$ goes from "0" to "1" and hence the signal at the output of the NAND gate $b_2$ also goes from "1" to "0", thus setting this set-reset type FF. This "0" signal is then applied to the NAND gate $b_3$ so that it is closed to prevent the passage of the reference pulses to the output of the NAND gate $b_3$. Consequently, the counting circuit $c$ stops its operation at the time $t_a$ in FIG. 14 and the outputs $Q_1$, $Q_2$, $Q_3$ and $Q_4$ of the counting circuit $c$ hold the respective signals thereat, i.e., the "1" signal at the output $Q_1$, "0" signal at the output $Q_2$, "0" signal at the output $Q_3$ and "1" signal at the output $Q_4$ until the next operation repeat reset signal shown in FIG. 14(6) arrives at a time $t_c$. Consequently, the 4-bit digital signal representative of the detected fuel level displacement and corresponding to the retained signal states "1", "0", "0", "1" are delivered to the terminals $i$, $j$, $k$ and $l$. On the other hand, the sensing element $h_3$ in the fuel level displacement sensor $h$ in FIG. 13 changes its resistance value in accordance with the variation of the fuel level (i.e., the resistance value increases as the fuel level drops). If, for example, the fuel level rises so that the potential at the point holds $h_a$, i.e., the detected voltage $V_0$ shown in FIG. 14(7) or 14(8) drops and the signal at the output of the comparator $e_1$ goes from "1" to "0" at a time $t_d$ in FIG. 14, the counting circuit $c$ stops its operation at the time $t_d$ in FIG. 14 and hold a 4-bit digital signal corresponding to the "0" signal at the output $Q_1$, "0" signal at the output $Q_2$, "1" signal at the output $Q_3$ and "0" signal at the output $Q_4$. Thus, the digital signal is generated which comprises "0" at the output terminal $i$, "0" at the output terminal $j$, "1" at the output terminal $k$ and "0" at the output terminal $l$. Thus, in this embodiment 16 different fuel levels may be indicated with all digital signals possible with different combinations of 4-bits. In this embodiment, the supply voltage is always applied terminal $V_{DD}$ and the supply voltage is also always applied through the supply terminal $V_{DD}$ to the gating circuit $b$ and the counting circuit $c$ which are not connected to the supply terminals $V_{CC}$ and $V_{DD}$ in FIG. 13.

On the other hand, when the key switch is turned off, that is, when the supply voltage is applied only to the supply terminal $V_{DD}$, an output $e_0$ of the comparator $e_1$ always has a "1" signal since it is connected to the supply terminal $V_{DD}$ through a resistor $r$. Consequently, the NAND gate $b_2$ of the set-reset type FF comprising the NAND gates $b_1$ and $b_2$ always has a "1" signal at its output. Further, since the supply voltage is not supplied to the supply terminal $V_{CC}$, a line $a_{L1}$ connected to one input of the NAND gate $a_4$ always has a "0" signal on it and thus the output of the NAND gate $a_4$ always has a "1" signal. This "1" signal is then inverted by the inverting gate $a_3$ and thus the counting circuit $c$ is always rendered operative. Consequently, the reference pulses are applied to the input of the counting circuit $c$ through the NAND gate $b_3$ and the counting circuit $c$ comes into operation producing a "1" signal at each of the outputs $Q_1$, $Q_2$, $Q_3$ and $Q_4$. This causes the signal at the output of the NAND gate $b_5$ constituting the inhibit logical circuit to go from "1" to "0" and prevents the application of the reference pulses to the input of the counting circuit $c$. As a result, each of the outputs $Q_1$, $Q_2$, $Q_3$ and $Q_4$ of the counting circuit $c$ continues to hold the "1" signal thereat independently of the operating conditions of the sensing element $h_3$ in the fuel level displacement sensor $h$.

Thus, all of the output terminals $i$, $j$, $k$ and $l$ have a "1" signal thereat and no indication is given by a load that will be described later. In this way, when the key switch is in the off position, no current is supplied to the count-voltage conversion circuit $d$, the comparison circuit $e$ and the fuel level displacement sensor $b$, thereby preventing the overdischarge of the battery when the system of this invention is installed in a vehicle.

Figure 15A:
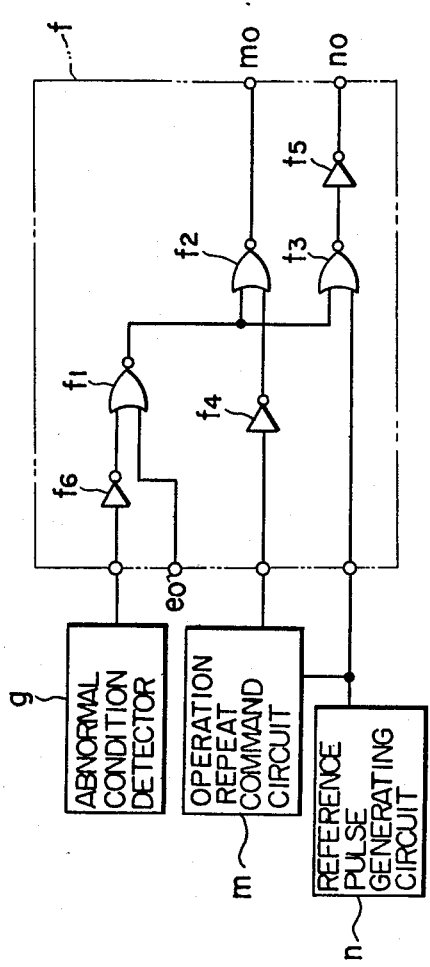
FIG. 15a and FIGS. 15b(1) through 15b(7) respectively show a detailed circuit of the inhibit circuit used in the embodiment of FIG. 12 and diagrams showing the waveforms generated at various points in the circuit.
Figure 15B:
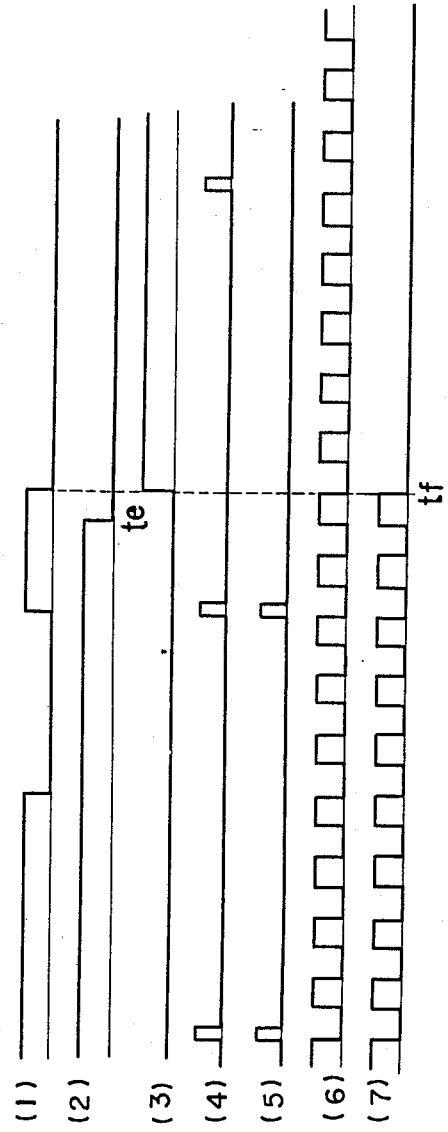

Referring now to FIGS. 15a and 15b, there are respectively illustrated a circuit diagram of the inhibit circuit section comprising the inhibit circuit $f$ and the abnormal detector $g$ and waveforms generated at various points in the circuitry. By connecting the inhibit circuit section shown in FIG. 15a in such a manner as indicated in broken lines in the block A of FIG. 12, it is possible to prevent any erroneous detection due to the fact that when, for example, the vehicle goes upgrade or downgrade, the liquid level in the fuel tank fluctuates and thus it does not reflect the correct fuel quantity. When such abnormal conditions occur, as shown in FIG. 15$b$(2), the abnormal condition detector $g$ generates a "1" signal or an abnormal signal at a time $t_e$ and this signal is applied, after inversion by an inverting gate $f_6$, to one input of a NOR gate $f_1$. At this time, the signal shown in FIG. 15$b$(1) (the same as the waveform shown in FIG. 14(9)), i.e., the output $e_0$ of the comparator $e_1$ shown in FIG. 13 has been applied to the other input of the NOR gate $f_1$. Consequently, the NOR gate $f_1$ generates at its output the signal shown in FIG. 15$b$(3) which goes from "0" to "1" at a time $t_f$ in FIG. 15$b$. This signal waveform shown in FIG. 15$b$(3) is applied to one input of NOR gates $f_2$ and $f_3$, respectively. The other input of the NOR gate $f_2$ receives the operation repeat reset signal shown in FIG. 15$b$(4) (the same as the waveform shown in FIG. 14(6)) which was generated from the operation repeat command circuit $m$ and inverted by an inverting gate $f_4$. Consequently, the waveform shown in FIG. 15$b$(5) is generated at an output terminal $m_0$ of the NOR gate $f_2$. On the other hand, the reference pulses shown in FIG. 15$b$(6) (the same as the waveform shown in FIG. 14(1)) have been applied from the reference pulse generating circuit $n$ to the other input of the NOR gate $f_3$. As a result, the waveform shown in FIG. 15$b$(7) is generated at an output terminal $n_0$ of an inverting gate $f_5$ which inverts the output of the NOR gate $f_3$. Thus, by respectively connecting the output terminals $m_0$ and $n_0$ shown in FIG. 15$a$ to the terminals $m_0$ and $n_0$ in FIG. 13, the counting circuit $c$ shown in FIG. 13 is not reset and the reference pulses are no longer applied to the counting circuit $c$ with the result that an inhibit signal from the abnormal condition detector $g$ is applied to the outputs $Q_1$, $Q_2$, $Q_3$ and $Q_4$ of the counting circuit $c$ and it retains the count existed when the comparator $e_1$ generated its output. Thereafter, when the vehicle returns to its normal conditions, the inhibit signal terminates and goes to "0" so that the output of the NOR gate $f_1$ normally has a "0" signal thereat and the regular signals shown respectively in FIGS. 15$b$(4) and 15$b$(6) are generated respectively at the terminals $m_0$ and $n_0$ in FIG. 15$a$ (the same as the terminals $m_0$ and $n_0$ in FIG. 13). Thereafter, exactly the same operation as the previously described operation of the circuitry shown in FIG. 13 takes place, and in this way any indication of the incorrect quantity under the abnormal conditions is prevented.

While in this second embodiment, the abnormal condition detector $g$ is of the similar type as used in the previously described first embodiment and shown in FIGS. 11$a$ and 11$b$, the inverting gate $g_5$ in the abnormal condition detector $g$ may be eliminated by eliminating the inverting gate $f_6$ in the inhibit circuit $f$.

The operating block B gives an indication of the displacement of the fuel level as represented by a 4-bit digital transmitting signal at the output terminals $i, j, k$ and $l$ of the A-D conversion block A which is produced by converting the displacement of the fuel level into the corresponding digital signal in the above-described manner, and it has a circuit construction such as is shown in FIG. 4 and used in the first embodiment. The demodulated signal corresponding to the digital transmitting signal is received at its input terminals $i', j', k'$ and $l'$. To utilize the time-sharing multiplex signal transmission system shown in FIGS. 5 through 10 in the like manner as described in connection with the first embodiment, the inverted signal of the digital signal at the output terminals $i, j, k$ and $l$ in FIG. 13 is applied to the input terminals $i', j', k'$ and $l'$.

Assuming now that the digital signal corresponding to the conditions at the time $t_a$ in FIG. 14 is applied to the input terminals $i', j', k'$ and $l'$, a "0" signal is applied to the terminal $i'$, a "1" signal to the terminal $j'$, a "1" signal to the terminal $k'$ and a "0" signal to the terminal $l'$, so that the transistors $PT_2$ and $PT_3$ are turned on and the transistors $PT_1$ and $PT_2$ are cut off. Consequently, the resistance value $R_1$ across the power supply terminals is given as $R_1 = 1/6 \cdot (PR_4)$, where $PR_4$ is the resistance value of the collector resistor $PR_4$. Thus, if the terminal $V_{CC}$ is connected to the positive terminal of the power supply and the terminal $V_{GND}$ is connected to the negative terminal of the power supply, then a current $I_1$ that flows to the indicator Q is given as $I_1 = 6.V/(PR_4)$, where V is the power supply voltage, and the needle of the indicator Q gives an indication of the displacement of the fuel level.

On the other hand, when the digital signal corresponding to the conditions at the time $t_d$ in FIG. 14 is received, the similar operation as mentioned earlier takes place so that the transistors $PT_1$, $PT_2$ and $PT_4$ are turned on and the transistor $PT_3$ alone is cut off, and a current $I_2$ that flows to the indicator Q is given as $I_2 = 13.V(PR_4)$. Thus, the needle of the indicator Q gives an indication of the corresponding displacement of the fuel level.

In the like manner as described in connection with the first embodiment, also in this second embodiment selected one out of 16 different currents $0.V/(PR_4)$, $1.V/(PR_4)$, $2.V/(PR_4)$, $3.V/(PR_4)$, . . . , $15.V/(PR_4)$ flows to the indicator Q depending on the combination of signals applied to the input terminals $i', j', k'$ and $l'$, and the needle of the indicator Q is moved in accordance with the magnitude of the current supplied and indicates the corresponding displacement of the fuel level. While, in this second embodiment, 16 kinds of combination are available, variation of the detected values of the sensor $h$ may be more minutely indicated by increasing the number of stages in the counting circuit $c$ of FIG. 13 and the number of the corresponding transistors and resistors in the logical actuating circuit P of FIG. 4.

Further, if the indicator Q is of a digital type, the logical actuating circuit P may be eliminated in some instances.

When the 4-bit digital signal at the output terminals $i, j, k$ and $l$ in FIG. 12 is to be transmitted through the time-sharing multiplex signal transmission system shown in FIGS. 5 through 10, the circuits shown in FIG. 7 may be utilized in place of the operation repeat command circuit $m$ and the reference pulse generating circuit $n$ in FIG. 12 and it may also be arranged so that the reset signal 151 shown in FIG. 5$b$(8) is applied to the input terminal $m_0$ and the signal 122 or the refernce pulse shown in FIG. 5$b$(1) is applied to the input terminal $n_0$. Further, the terminal $i$ is connected to the terminal 220 in FIG. 8 and the terminals 211 and 212 are connected, as previously described, to the terminals 130-1 and 140-6 of FIG. 7, for example, for the purposes of specifying the address, whereby in the time-sharing multilpex communication signal, the signal state of the signal generated at the terminal $i$ in FIG. 12 appears at the time interval corresponding to the address 61. In other words, when a "0" signal appears at the terminal *i* in FIG. 12, the signal shown in FIG. 5*b*(3) appears in which there is a "0" level at the address 61, whereas when a "1" signal appears at the terminal *i*, the signal shown in FIG. 5*b*(3) appears in which there is no "0" level at the address 61. Similarly, by connecting the terminal *j* in FIG. 12 to the terminal 220*a* in FIG. 8 and the terminals 211*a*, and 212*a* to the terminals 130-2 and 140-6 in FIG. 7, for example, the signal state of the signal at the terminal *j* in FIG. 12 appears at the address 62. This equally applies to the other terminals *k* and *l*. The signals thus transmitted form the level signal 124 shown in FIG. 5*b* and it is sent to the block of the receiver 4 over the line L₃ in FIG. 5*a*.

To reproduce the signals corresponding to those at the output terminal *i*, *j*, *k* and *l* of the conversion block A in FIG. 12 at the input terminals *i'*, *j'*, *k'* and *l* in the operating block B in FIG. 12, it is necessary in the block of the receiver 4 to provide the similar address selection connections as mentioned earlier for the terminals 211', 212'; 211*a*', 212*a*'; 211*b*', 212*b*', and 211*c*', 212*c*' in FIG. 10. In other words, for the terminal *i'*, the terminal 211' in FIG. 10 is connected to the output terminals 130'-1 and 140-6 in FIG. 9 so that the inverted signal of the signal state at the terminal *i* in FIG. 12 appears at the output terminal 361 in FIG. 10. Further, by connecting the terminals 211*a*' and 212*a*' in FIG. 10 respectively to the terminals 130'-2 and 140'-6 in FIG. 9, the inverted signal of the signal state generated at the terminal *j* in FIG. 12 appears at the output terminal 361*a* in FIG. 10. Furthermore, the signals generated at the terminals *k* and *l* may be received in the similar manner by connecting the terminals 211*b*' and 212*b*' and the terminals 211*c*' and 212*c*' in FIG. 10 to effect the required address selection with the outputs of the scale-of-10 counters 130' and 140' in FIG. 9 whereby the inverted signals of the signal stages generated at the terminals *k* and *l* in FIG. 12 respectively appear at the corresponding output terminals 361*b* and 361*c* in FIG. 10. The signals thus generated at the output terminals 361, 361*a*, 361*b* and 361*c* in FIG. 10 are then applied to the corresponding terminals *i'*, *j'*, *k'* and *l'* in FIG. 12. In this way, the signal states at the terminals *i*, *j*, *k* and *l* may be reproduced at the terminals *i'*, *j'*, *k'* and *l* to cause the indicator Q to give an indication of the corresponding displacement of the fuel level through the logical actuating circuit P.

We claim:

1. A digital displacement detecting system for detecting the amount of displacement in the form of a digital value comprising:
   a reference pulse operating means for generating reference pulses having a predetermined frequency;
   a counting means having an input terminal connected to said reference pulse generating means and a plurality of output terminals each associated with a different stage of the counting means, said counting means being resettable at predetermined intervals of time to count said reference pulses in the form of a digital value;
   a count-voltage conversion means having a plurality of input terminals connected to the plurality of output terminals of said counting means and an output terminal whereby the count of said counting means in converted into a count voltage having an analog value corresponding to said count;
   a displacement sensor for generating a detected voltage having an analog value corresponding to the amount of displacement detected;
   a comparison means having a first input terminal connected to said displacement sensor, a second input terminal connected to the output terminal of said count-voltage conversion means and an output terminal whereby an output is generated when said count voltage generated by said count-voltage conversion means attains the value of said detected voltage generated by said displacement sensor; and
   a count holding means response to an output signal generated at the output terminal of said comparison means, thereby to hold the counted value of said counting means as a plurality of binary bits until the next output signal generated at the output terminal of said comparison means, said count holding means having a plurality of output terminals each associated with a respective stage of the counting means.

2. A digital displacement detecting system according to claim 1, wherein said count holding means comprises a memory means comprises a memory means having a plurality of controlled signal input terminals connected to the plurality of output terminals of said counting means, a control signal input terminal connected to said comparison means, and a plurality of output terminals, whereby each time an output of said comparison means is applied to said memory means, said memory means directly stores and holds in the form a digital value the count of said counting means which existed at the time of the application of said output from said comparison means.

3. A digital displacement detecting system according to claim 2, further comprising an inhibit means connected between said comparison means and the control signal input terminal of said memory means, whereby when ambient conditions occur which result in an abnormal fluctuation in the amount of displacement detected by said displacement sensor, the output of said comparison means is prevented by said inhibit circuit means from being applied to the control signal input terminal of said memory means.

4. A digital displacement detecting system according to claim 2 further comprising a transmitter connected to the plurality of output terminals of said memory means whereby the stored value of said memory means is transmitted after pulse modulation, a receiver for receiving and demodulating the signal transmitted from said transmitter, and a load connected to said receiver and actuated by said signal demodulated by said receiver.

5. A digital displacement detecting system according to claim 4, wherein said load comprises an indicator for giving an indication of the detected amount of displacement in accordance with said demodulated signal by said receiver.

6. A digital displacement detecting system according to claim 1, wherein said counting means is further provided with a reset terminal for the resetting thereof, wherein said count holding means comprises a gating means having a control signal input terminal connected to said reference pulse generating means, an output terminal connected to the input terminal of said counting means, and a control signal input terminal connected to the output terminal of said comparison means whereby when the output of said comparison means is applied to said control signal input terminal, the further counting of reference pulses from said reference pulse generating means by said counting means is prevented so that the current count of said counting means is stored and held by said counting means, and wherein there is further provided a reset signal means connected to said reset terminal of said counting means for generating reset pulses whereby said counting means is reset at predetermined intervals of time following the storing and holding operation of said counting means.

7. A digital displacement detecting system according to claim 6, wherein said gating means is provided with an inhibit logical means connected to the plurality of output terminals of said counting means whereby when the count of said counting means attains a predetermined value, the application of the reference pulses from said reference pulse generating means to the input terminal of said counting means is prevented.

8. A digital displacement detecting system according to claim 6 further comprising means for detecting an abnormal condition and producing an abnormal condition signal and an inhibit means connected to said reset signal generating means and said abnormal condition detecting means for preventing, in response to said abnormal condition signal, the reset signal from said reset signal generating means from being applied to the reset terminal of said counting means.

9. A digital displacement detecting system according to claim 6 further comprising a transmitter connected to the plurality of output terminals of said counting means whereby the count stored and held in said counting means is transmitted after pulse modulation, a receiver for receiving and demodulating the signal transmitted from said transmitter, and a load connected to said receiver whereby said load is actuated with said signal demodulated by said receiver.

10. A digital displacement detecting system according to claim 9, wherein said load comprises an indicator for giving an indication of the detected amount of displacement in accordance with said demodulated signal by said receiver.

11. A digital displacement detecting system according to claim 7 further comprising means for detecting an abnormal condition and producing an abnormal condition signal and an inhibit means connected to said reset signal generating means and said gating means and said abnormal condition detecting means for preventing, in response to said abnormal condition signal, the application of the reset signal from said reset signal generating means to the reset terminal of said counting means and the application of the reference pulses from said reference generating means to the input terminal of said counting means.

12. A digital displacement detecting system according to claim 1 further comprising a receiver responsive to an output signal of said counting means when said counting means is held by said counting holding means, thereby to produce a signal indicating the detected amount of displacement.

13. A digital displacement detecting system for detecting the amount of displacement of the level of fluid in a tank in the form of a digital value comprising:
reference pulse generating means for generating reference pulses having a predetermined frequency;
counting means having an input terminal connected to said reference pulse generating means and a plurality of output terminals and resettable at predetermined intervals of time to count said reference pulses in the form of a digital value;
count-voltage conversion means having a plurality of input terminals connected to the plurality of output terminals of said counting means and an output terminal whereby the count of said counting means is converted into a count voltage having an analog value corresponding to said count;
a displacement sensor for generating a detected voltage having an analog value corresponding to said fluid level;
comparison means having a first input terminal connected to said displacement sensor, a second input terminal connected to the output terminal of said count-voltage conversion means and an output terminal whereby an output is generated when said count voltage generated by said count-voltage conversion means attains the value of said detected voltage generated by said displacement sensor;
a count holding means responsive to an output signal generated at the output terminal of said comparison means, thereby to hold the counted value of said counting means;
means for detecting an abnormal condition which would erroneously vary the analog value of said displacement sensor and producing an abnormal condition signal in response thereto; and
inhibit logic means connected between said count holding means and said comparison means for preventing passage of said output signal generated by the output terminal of said comparison means to said count holding means when said abnormal condition signal is produced.

14. A system as in claim 13 wherein said sensor includes means for detecting the level of gasoline in an automobile tank and said abnormal condition detecting means includes means for detecting the inclination of a vehicle and producing said abnormal condition signal whenever said inclination exceeds a predetermined value.

* * * * *